(12) United States Patent
Einziger et al.

(10) Patent No.: US 9,132,408 B2
(45) Date of Patent: Sep. 15, 2015

(54) LOSS PROFILE ANALYSIS

(75) Inventors: Pinchas Einziger, Haifa (IL); Eran Ben-Shmuel, Savyon (IL); Alexander Bilchinsky, Monosson-Yahud (IL); Amit Rappel, Ofra (IL)

(73) Assignee: GOJI LIMITED, Hamilton (BM)

( * ) Notice: Subject to any disclaimer, the term of this patent is extended or adjusted under 35 U.S.C. 154(b) by 360 days.

(21) Appl. No.: 13/696,003

(22) PCT Filed: May 3, 2011
(Under 37 CFR 1.47)

(86) PCT No.: PCT/IB2011/001489
§ 371 (c)(1),
(2), (4) Date: Nov. 2, 2012

(87) PCT Pub. No.: WO2011/138688
PCT Pub. Date: Nov. 10, 2011

(65) Prior Publication Data
US 2013/0240757 A1 Sep. 19, 2013

Related U.S. Application Data

(60) Provisional application No. 61/282,980, filed on May 3, 2010, provisional application No. 61/282,981, filed on May 3, 2010, provisional application No. 61/282,983, filed on May 3, 2010, provisional (Continued)

(51) Int. Cl.
*G01R 27/00* (2006.01)
*B01J 19/12* (2006.01)
*H05B 6/64* (2006.01)

(52) U.S. Cl.
CPC ............ *B01J 19/129* (2013.01); *H05B 6/64* (2013.01); *H05B 6/6447* (2013.01)

(58) Field of Classification Search
CPC ................................ H05B 6/64; H05B 6/6447
USPC .................................... 324/632–639; 219/702
See application file for complete search history.

(56) References Cited

U.S. PATENT DOCUMENTS 3,019,399 A 1/1962 Lanciani et al.
4,196,332 A 4/1980 MacKay et al.
(Continued)

FOREIGN PATENT DOCUMENTS

EP 0526297 A1 2/1993
EP 1021067 A2 7/2000
(Continued)

OTHER PUBLICATIONS

Communication pursuant to Article 94(3) EPC related to EP Application No. 11743326.8, mailed Feb. 21, 2014.
(Continued)

*Primary Examiner* — Vincent Q Nguyen
(74) *Attorney, Agent, or Firm* — Finnegan, Henderson, Farabow, Garrett & Dunner LLP

(57) ABSTRACT

Apparatuses and methods are disclosed for applying radio frequency (RF) energy to an object in an energy application zone. At least one processor may be configured to cause RF energy to be applied at a plurality of electromagnetic field patterns to the object in the energy application zone. The processor may be further configured to determine an amount of power dissipated in the energy application zone, for each of the plurality of field patterns. The processor may also be configured to determine a spatial distribution of energy absorption characteristics across at least a portion of the energy application zone based on the amounts of power dissipated when the plurality of field patterns are applied to the energy application zone.

20 Claims, 17 Drawing Sheets

Related U.S. Application Data application No. 61/282,984, filed on May 3, 2010, provisional application No. 61/282,985, filed on May 3, 2010, provisional application No. 61/282,986, filed on May 3, 2010.

(56) References Cited

U.S. PATENT DOCUMENTS

| | | | |
|---|---|---|---|
| 4,464,554 | A | 8/1984 | Bakanowski et al. |
| 5,441,532 | A | 8/1995 | Fenn |
| 5,485,743 | A | 1/1996 | Taherian et al. |
| 5,632,921 | A | 5/1997 | Risman et al. |
| 5,828,040 | A | 10/1998 | Risman |
| 5,834,744 | A | 11/1998 | Risman |
| 6,104,018 | A | 8/2000 | Varma et al. |
| 2003/0047559 | A1 | 3/2003 | Watanabe et al. |
| 2009/0071110 | A1 | 3/2009 | Gonze et al. |
| 2009/0178858 | A1 | 7/2009 | Daniels et al. |
| 2010/0155392 | A1 | 6/2010 | Nordh et al. |
| 2010/0176123 | A1 | 7/2010 | Mihara et al. |
| 2010/0237067 | A1 | 9/2010 | Nordh et al. |
| 2010/0252551 | A1 | 10/2010 | Nordh et al. |
| 2012/0067872 | A1 * | 3/2012 | Libman et al. ............... 219/702 |

FOREIGN PATENT DOCUMENTS

| | | |
|---|---|---|
| EP | 2051564 A1 | 4/2009 |
| JP | 2008-310969 | 12/2008 |
| WO | WO 91/07069 | 5/1991 |
| WO | WO 98/35532 | 8/1998 |
| WO | WO 02/23953 A1 | 3/2002 |
| WO | WO 2009/050893 A1 | 4/2009 |

OTHER PUBLICATIONS

Communication pursuant to Article 94(3) EPC related to EP Application No. 11729472.8, mailed Feb. 28, 2014.

Communication pursuant to Article 94(3) EPC related to EP Application No. 11731499.7, mailed Feb. 21, 2014.

Communication pursuant to Article 94(3) EPC related to EP Application No. 11738283.8, mailed Feb. 20, 2014.

Bows et al., Microwave phase control heating, International Journal of Food Science and Technology 1999, v. 34, pp. 295-304.

Mammano, Resonant Mode Converter Topologies, 2001, Texas Instruments Incorporated, Topic 1, pp. 1-12.

Narvaez, Truine Ethics: The neurobiological roots of our multiple moralities, New Ideas in Psychology 26 (2008) 95-119.

Schubert et al., Resonant cavity light-emitting diode, Appl. Phys., Lett. vol. 60, No. 8, 1992, pp. 921-923.

\* cited by examiner

| sub-volume | σ |
|---|---|
| $V_1$ | $3.5 \times 10^{-11}$ |
| $V_2$ | $2 \times 10^{-2}$ |
| $V_3$ | $4.76 \times 10^{-2}$ |
| ⋯ | |
| $V_{Nd}$ | $8.1 \times 10^{-9}$ |

| sub-volume | tanδ |
|---|---|
| $V_1$ | $3.2 \times 10^{-4}$ |
| $V_2$ | $2.93 \times 10^{-5}$ |
| $V_3$ | $0.42$ |
| ⋯ | |
| $V_{Nd}$ | $5.8 \times 10^{-9}$ |

LOSS PROFILE ANALYSIS

This application is a national phase application based on PCT/IB2011/001489, filed May 3, 2011, the content of which is incorporated herein by reference. The present application claims the benefit of priority to U.S. Provisional Patent Application No. 61/282, 980, filed on May 3, 2010; U.S. Provisional Patent Application No. 61/282,981, filed on May 3, 2010; U.S. Provisional Patent Application No. 61/282,983, filed on May 3, 2010; U.S. Provisional Patent Application No, 61/282,984, filed on May 3, 2010; U.S. Provisional Patent Application No. 61/282,985, filed on May 3, 2010; and U.S. Provisional Patent Application No. 61/282,986, filed on May 3, 2010. Each of these applications is fully incorporated herein in its entirety.

TECHNICAL FIELD

The present application relates to apparatus and methods for applying electromagnetic energy to an object.

BACKGROUND

Electromagnetic waves are commonly used to apply energy to objects. Typically, such objects are located in a cavity configured to receive electromagnetic energy. However, because the electromagnetic field distribution may be dependent on the properties (e.g., size of the object), location, and orientation of the object as well as characteristics of the source from which the energy is applied, it is often difficult to apply electromagnetic energy in a controllable manner. One example of an electromagnetic energy application device is a microwave oven. In a microwave oven, microwaves are used to apply electromagnetic energy from an energy source to the object through air. The electromagnetic energy is then absorbed by the object and converted to thermal energy, causing the temperature of the object to rise. A microwave oven cannot differentiate one region from another in the heating space and deliver controlled amounts of energy to these regions. That is, a typical microwave oven is "blind" to the object being heated and cannot tell either the location or the energy absorption characteristics of the object.

SUMMARY

Some exemplary aspects of the present disclosure may be directed to an apparatus and a method for applying electromagnetic energy to an object in an energy application zone. The apparatus may include at least one processor configured to cause electromagnetic energy to be applied at a plurality of electromagnetic field patterns to the object in the energy application zone. The processor may be further configured to determine an amount of power dissipated in the energy application zone, for each of the plurality of field patterns. The processor may also be configured to determine a spatial distribution of energy absorption characteristics across at least a portion of the energy application zone based on the amounts of power dissipated when the plurality of field patterns are applied to the energy application zone.

The processor may be further configured to calculate the distribution of energy absorption characteristics based on at least one of an electromagnetic field intensity associated with each of the plurality of field patterns, and power dissipated in the energy application zone at each of the plurality of field patterns.

As used herein, an object (e.g., a processor) is described to be configured to perform a task (e.g., calculate a distribution), if, at least in some embodiments, the object performs this task in operation. Similarly, when a task (e.g., control a distribution of electromagnetic energy) is described to be in order to establish a target result (e.g., in order to apply a plurality of electromagnetic field patterns to the object) this means that, at least in some embodiments, the task is carried out such that the target result is accomplished.

In some embodiments, the processor may be configured to recurringly determine a distribution of energy absorption characteristics. A time lapse between two determinations of distributions of energy absorption characteristics, for example, the time lapse between two successive determinations, may be a function of a magnitude of a difference between the distributions measured at two previous determinations. For example, the time lapse between the second and third determinations may be a function of the magnitude of a difference between the distributions measured at the first and second determinations. In some embodiments, a magnitude of a difference between two distributions may be determined as a function of the two distributions. Examples of such functions may include a difference between the amounts of energy applied to a given location in the two distributions, and an average of energy difference between the distributions across some region. Alternatively or additionally, the time lapse between two successive determinations of distributions of energy absorption characteristics may be a function of characteristics of the object.

Further, the processor may be configured to cause differing amounts of energy to be applied to differing portions of the energy application zone based on the distribution of energy absorption characteristics. The processor may also be configured to cause controlled amounts of energy to be absorbed at differing locations in the object.

Some exemplary aspects of the present disclosure may be directed to an apparatus and a method for applying electromagnetic energy to an object. The apparatus may comprise a source of electromagnetic energy. In addition, the apparatus may comprise an energy application zone. Moreover, the apparatus may comprise at least one processor. The processor may be configured to cause electromagnetic energy to be applied in a plurality of electromagnetic field patterns to the object in the energy application zone. The processor may also be configured to determine an amount of power dissipated in the energy application zone for each of the plurality of field patterns. In addition, the processor may be configured to determine a spatial distribution of energy absorption characteristics across at least a portion of the object based on the amounts of power dissipated when the plurality of field patterns are applied to the energy application zone.

Some exemplary aspects of the present disclosure may be directed to an apparatus and a method for applying electromagnetic energy in the radio frequency range (RF energy) to an energy application zone via at least one radiating element. The apparatus may comprise at least one processor. The processor may be configured to control distribution of RF energy such that at least two mutually different electromagnetic field patterns are applied to the energy application zone. In addition, the processor may be configured to determine an amount of power dissipated in the energy application zone for each of the electromagnetic field patterns. Moreover, the processor may be configured to determine a spatial distribution of energy absorption characteristics across at least a portion of the energy application zone based on the amounts of power determined for each of the field patterns.

The preceding summary is merely intended to provide the reader with a very brief flavor of a few aspects of the invention, and is not intended to restrict in any way the scope of the claimed invention. In addition, it is to be understood that both the foregoing general description and the following detailed description are exemplary and explanatory only and are not restrictive of the invention, as claimed. It is noted that the term exemplary is used herein in the sense of serving as an example, instance, or illustration.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Figure 1:
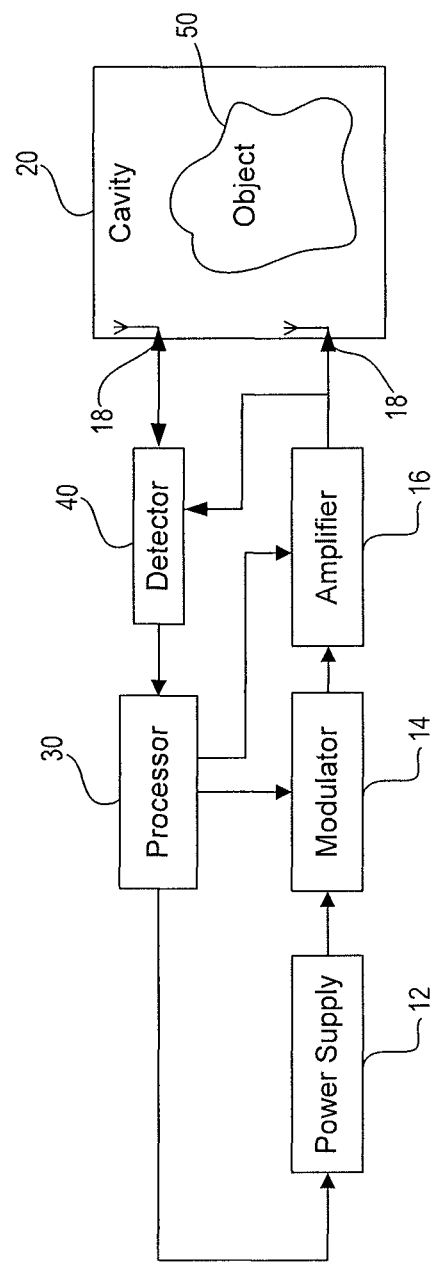
FIG. 1 is a schematic diagram of an apparatus for applying electromagnetic energy to an object, in accordance with some exemplary embodiments of the present invention.

An exemplary aspect of some embodiments includes determining a loss profile of an energy application zone. A loss profile may be any representation of the way in which a dielectric property changes from one place to another in the energy application zone. The energy application zone may be any volume of space to which electromagnetic energy may be applied. An energy application zone may be empty, or may include an object or a portion of an object. The object in the energy application zone may occupy the zone wholly or partially.

An example of a loss profile may be a graph or table showing the dielectric constant or any other absorption property and/or related parameters associated with given location within the energy application zone, e.g., as a function of the distance from a given point. Another example of a loss profile is a three-dimensional map, in which volume portions of the energy application zone having different energy absorption properties appear in different colors. Any other representation of one or more of these or other dielectric/absorption properties as a function of location in the energy application zone may be used as a loss profile. In addition, the term loss profile may refer to approximations of a spatial distribution of one or more dielectric properties. For example, the actual spatial distribution may be calculated, simulated, or measured at some limited accuracy, which, at times, may be quite low, to obtain a loss profile.

In some embodiments, a loss profile may be determined by an electronic digital processor. The processor may determine the loss profile by applying certain rules (e.g., calculations) to data (or signals indicative of data) collected by detectors that may be placed inside, around, and/or outside of the energy application zone. The loss profile may be determined by running a computer program which uses such data as input, and provides the loss profile as output. The data may include any value indicative of the absorption of electromagnetic energy at a given location. In some embodiments, the electromagnetic energy may be supplied to the energy application zone by exciting different electromagnetic field patterns in the zone, and the data may include different values of energy absorbability detected when the different field patterns are excited. Exciting a field pattern in the energy application zone may be accomplished by applying to the energy application zone an electromagnetic wave having a certain frequency, phase, and/or other characteristics corresponding to the field pattern. As used herein, the term "excited" is interchangeable with "generated," "created," and "applied."

For example, if the energy application zone consists of two regions, one that absorbs energy and one that substantially does not absorb energy, then field patterns that coincide with only the first region will be absorbed, while field patterns that coincide only with the second region will not be absorbed. Thus, the location of the two regions may be deduced from knowledge of which field patterns cause energy absorption and which do not. In more complicated cases, similar considerations may be applied by solving, for example, equation (1), as discussed below.

Reference will now be made in detail to exemplary embodiments of the invention, examples of which are illustrated in the accompanying drawings. When appropriate, the same reference numbers are used throughout the drawings to refer to the same or like parts.

As illustrated in FIGS. 1, 5A, 5B, 6, 7A and 7B, embodiments of the invention may include a source of electromagnetic energy (e.g., including structures such as a power supply 12 and/or oscillators 22, 26). The source may be regulated by a processor 30, such that energy may be applied to an energy application zone. Structures such as power supply 12 and oscillators 22, 26 may be used to apply electromagnetic energy via one or more radiating elements 18 to a load such as object 50 located in the energy application zone, which in the figures is illustrated as cavity 20. Processor 30 may be configured to control distribution of electromagnetic energy. For example, the processor may control the source directly. Alternatively or additionally, processor 30 may control a signal emanating from the source, or downstream from the source.

Processor 30 may be configured to control spatial distribution of electromagnetic energy such that a plurality of electromagnetic field patterns is applied to the object in the energy application zone. As discussed later in greater detail, by altering one or more variable parameters that may affect a field pattern in the energy application zone (e.g., frequency, amplitude, etc., referred to herein as "modulation space elements" (MSEs)), it is possible to change a field pattern in the energy application zone, e.g., in cavity 20. Thus, sequential adjustment of such variables may cause associated sequential changes in the field patterns applied to the energy application zone 20.

Figure 3B:
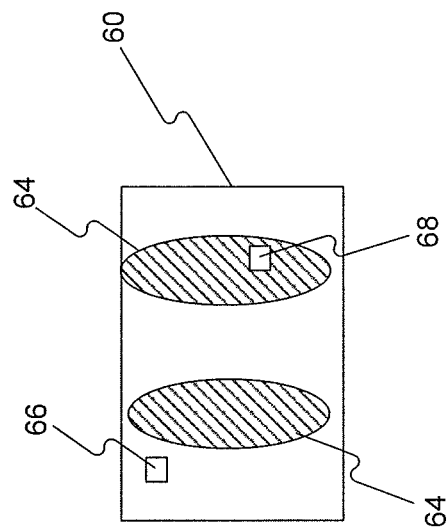
FIGS. 3A and 3B illustrate exemplary field patterns in a modal cavity consistent with some embodiments of the invention.
Figure 3A:
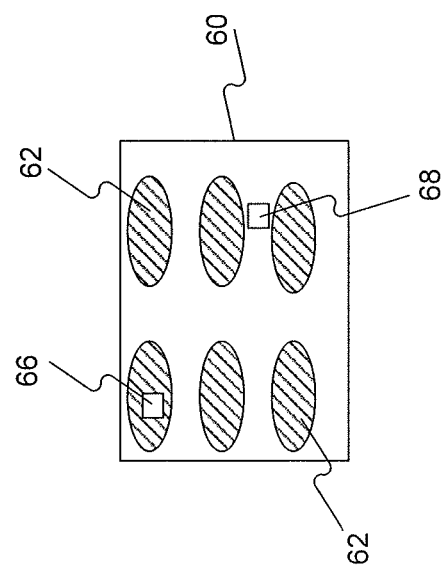

Such changes in field patterns often affect absorption by the object because, for instance, different field patterns may be absorbed differently in the object. For example, changing a field pattern having high energy intensity at areas that coincide with the object to a pattern having lower energy intensity at areas that coincide with the object may reduce the amount of energy absorbed by the object. FIGS. 3A and 3B, which each conceptually depict differing field patterns, are illustrative. In FIG. 3A the field pattern's high intensity areas 62 (a/k/a "hot spots") coincide with object 66. In contrast, with the field pattern of FIG. 3B there is no such coincidence with object 66. Therefore, object 66 is likely to absorb more energy when the field pattern of FIG. 3A is applied than when the field pattern of FIG. 3B is applied.

As discussed later in greater detail, non-absorbed energy may be reflected or otherwise transmitted to radiating element 18 and detected using detector 40. By receiving signals from detector 40, for each field pattern applied, the processor may be able to calculate an amount of power dissipated in the energy application zone 20. And by aggregating amounts of power dissipated by the energy application zone at various field patterns, processor 30 may then determine a spatial distribution of energy absorption characteristics across at least a portion of the object.

The determined spatial distribution of energy absorption characteristic (which may also be referred to as a determined loss profile) may serve as an indicator of how the object may absorb energy as energy application continues. Thus, once an energy absorption characteristic profile is known or estimated, the processor may be able to control energy application such that a desired energy absorption profile in the object is achieved.

When feedback information related to energy absorption by object 50 is combined with information about a plurality of known field patterns causing the feedback, processor 30 may be able to estimate the location of object 50 in energy application zone 20. Therefore, over an iterative series of applied field patterns, processor 30 may be able to identify areas where a load is present and areas where a load is absent. By aggregating this information, the general location of the load may be ascertained. And as the amount of applied field patterns and associated feedback increases, resolution may be increased. In some embodiments, the resolution may be increased to a point where a physical profile of the load (including, e.g., its contours) may be constructed.

In some respects, the invention may involve apparatus and methods for applying electromagnetic energy to an object in an energy application zone. As used herein, the term "apparatus" in its broadest sense may include any component or group of components described herein. For example, an "apparatus" as broadly used herein may refer only to a processor, such as processor 30, as illustrated, for example, in FIGS. 1 and 5A, 5B, 6, 7A, and 7B. Alternatively or additionally, an "apparatus" may include a combination of a processor and one or more radiating elements; a cavity, and one or more radiating elements; a source of electromagnetic energy; a processor, a cavity, one or more radiating elements, and a source of electromagnetic energy; or any other combination of components described herein.

The term electromagnetic energy, as used herein, includes any or all portions of the electromagnetic spectrum, including but not limited to, radio frequency (RF), infrared (IR), near infrared, visible light, ultraviolet, etc. In some cases, applied electromagnetic energy may include RF energy with a wavelength of 100 km to 1 mm, which is a frequency of 3 KHz to 300 GHz, respectively. In some cases, RF energy within a narrower frequency range, e.g., 1 MHz-100 GHz, may be applied. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum. However, the methods and apparatus described may be particularly useful for dealing with objects that are smaller than a wavelength of the applied electromagnetic energy. Furthermore, the described methods and apparatus may be particular useful when the energy application zone comprises a modal cavity, as defined below.

Similarly, this disclosure contains a number of examples of electromagnetic energy used for heating. Again, these descriptions are provided to illustrate exemplary principles of the invention. The invention, as described and claimed, may provide benefit for various products and industrial, commercial, and consumer processes involving the application of energy, regardless of whether the application of energy results in a temperature rise. For example, electromagnetic energy may be applied to an object for heating, combusting, thawing, defrosting, cooking, drying, accelerating reactions, expanding, evaporating, fusing, causing or altering biologic processes, medical treatments, preventing freezing or cooling, maintaining the object within a desired temperature range, or any other application where it is desirable to apply energy.

Moreover, reference to an "object" (also known as a "load") to which electromagnetic energy is applied is not limited to a particular form. An "object" may include a liquid, solid, or gas, depending upon the particular process with which the invention is utilized, and the object may include composites or mixtures of matter in one or more differing phases. Further, although the term "object" is in the singular, it may refer to multiple items or detached parts or components. Thus, by way of non-limiting example, the term "object" may encompass such matter as food to be thawed or cooked; clothes or other material to be dried; frozen material (e.g., organs) to be thawed; chemicals to be reacted; fuel or other combustible material to be to be combusted; hydrated material to be dehydrated; gases to be expanded; liquids to be thawed, heated, boiled or vaporized; blood or blood components (e.g., blood plasma or red blood cells) to be thawed and/or warmed; materials to be manufactured; components to be connected; or any other material for which there is a desire to apply, even nominally, electromagnetic energy.

In accordance with some embodiments of the invention, an apparatus or method may involve the use of an "energy application zone." An energy application zone may be any void, location, region, or area where electromagnetic energy may be applied. It may include a hollow, and/or may be filled or partially filled with liquids, solids, gases, or combinations thereof. By way of example only, an energy application zone may include the interior of an enclosure, interior of a partial enclosure (e.g., conveyor belt oven), interior of a conduit, open space, solid, or partial solid, which allows for the existence, propagation, and/or resonance of electromagnetic waves. The zone may be permanent or may be temporarily constituted for purposes of energy application. For ease of discussion, all such alternative energy application zones may alternatively be referred to as cavities, with the understanding that the term "cavity" implies no particular physical structure other than an area in which electromagnetic energy may be applied.

The energy application zone may be located in an oven, chamber, tank, dryer, thawer, dehydrator, reactor, furnace, cabinet, engine, chemical or biological processing apparatus, incinerator, material shaping or forming apparatus, conveyor, combustion zone, or any area where it may be desirable to apply energy. Thus, consistent with some embodiments, the electromagnetic energy application zone may be an electromagnetic resonator (also known as cavity resonator, resonant cavity, or simply "cavity"). The electromagnetic energy may be delivered to an object when the object or a portion thereof is located in the energy application zone.

An energy application zone may have a predetermined shape or a shape that is otherwise determinable, so long as physical aspects of its spatial form or contour are known at a time of energy application. The energy application zone may assume any shape that permits electromagnetic wave propagations inside the energy application zone. For example, all or part of the energy application zone may have a cross-section that is spherical, hemispherical, rectangular, toroidal, circular, triangular, oval, pentagonal, hexagonal, octagonal, elliptical, or any other shape or combination of shapes. It is also contemplated that the energy application zone may be closed, e.g., completely enclosed by conductor materials, bounded at least partially, or open, e.g., having non-bounded openings. The general methodology of the invention is not limited to any particular cavity shape, configuration, or degree of closure of the energy application zone, although in some applications, a high degree of closure or specific shapes may be preferred.

By way of example, an energy application zone, such as cavity 20, is illustrated diagrammatically in FIG. 1, where object 50 is positioned in cavity 20. It is to be understood that object 50 need not be completely located in the energy application zone. That is, object 50 may be considered to be "in" the energy application zone if at least a portion of the object is located in the zone.

Consistent with some of the presently disclosed embodiments, electromagnetic waves of at least one wavelength may resonate in the energy application zone. In other words, the energy application zone may support at least one resonant wavelength. For example, cavity 20 may be designed with dimensions permitting it to be resonant in a predetermined range of frequencies (e.g., the UHF or microwave range of frequencies, for example, between 300 MHz and 3 GHz, or between 400 MHz and 1 GHZ). Depending on the intended application, the dimensions of cavity 20 may be designed to permit resonances in other ranges of frequencies in the electromagnetic spectrum. The term "resonant" or "resonance" refers to the tendency of electromagnetic waves to oscillate in the energy application zone at larger amplitudes at some frequencies (known as "resonance frequencies") than at others. Electromagnetic waves resonating at a particular resonance frequency may have a corresponding "resonance wavelength" that is inversely proportional to the resonance frequency, determined via $\lambda = c/f$; where $\lambda$ is the resonance wavelength, f is the resonance frequency, and c is the propagating speed of the electromagnetic waves in the energy application zone. The propagating speed may change depending on the medium through which the wave propagates. Therefore, when the energy application zone comprises more than one material (for instance, load and void), c may not be uniquely defined. Nevertheless, resonance wavelengths may be uniquely determined using a slightly different relation, including, for example, using an estimation based on c of the major component or an average of the c of miscellaneous components, or any other technique known in the art.

Figure 2:
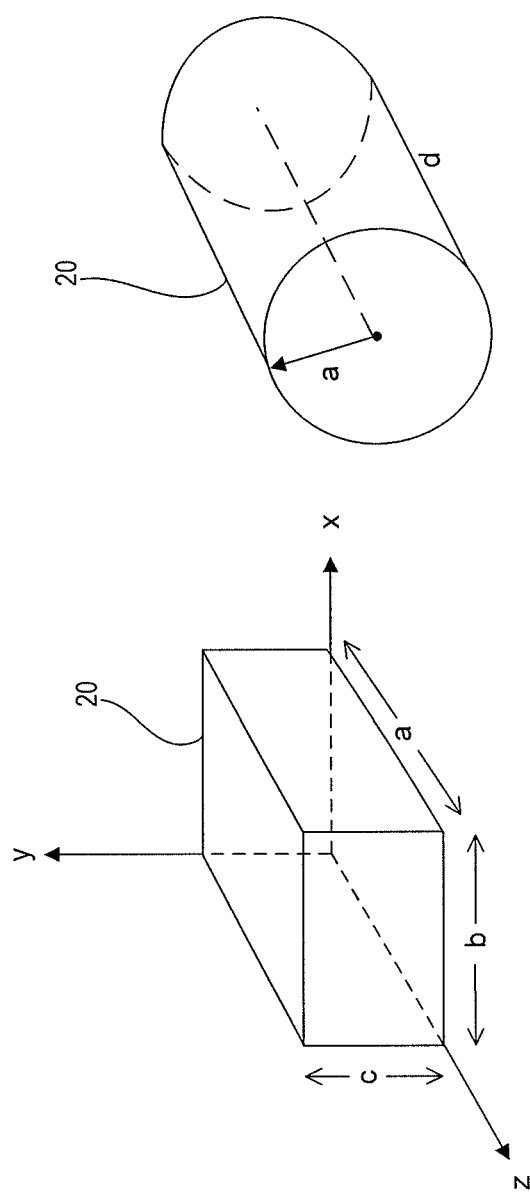
FIG. 2 illustrates a modal cavity satisfying a modal condition, in accordance with some exemplary embodiments of the present invention.

Among the resonant wavelengths that are supported by the energy application zone, there may be a largest resonant wavelength. The largest resonant wavelength may be determined uniquely by the geometry of the zone. In some embodiments, the largest resonant wavelength of any given energy application zone may be determined or estimated as known in the art, for example, experimentally, mathematically and/or by simulation. In some embodiments, the largest resonant wavelength may be known in advance (e.g., retrieved from a memory or programmed into a processor). By way of example, FIG. 2 illustrates a rectangular cavity 20 of dimensions length a, width b, and height c. Cavity 20 may support a plurality of resonant wavelengths, the largest resonant wavelength among which is $\lambda_0$. If a>b>c, then the largest resonant wavelength $\lambda 0$ is given by $$\frac{2ab}{\sqrt{a^2+b^2}}.$$

By way of another example, if the energy application zone is a cubic of dimensions a×a×a, then the largest resonant wavelength is given by $\sqrt{2}a$. In yet another example, if the energy application zone is a cylinder (for example as illustrated in FIG. 2) of radius a and length d, then the largest resonant wavelength is given by $$\frac{2\pi a}{2.405}$$

if 2a>d, and $$\frac{2\pi a}{\sqrt{1.841^2 + \left(\frac{\pi a}{d}\right)^2}}$$

if 2a<d. In another example, if the energy application zone is a sphere of radius a, then the largest resonant wavelength is given by $$\frac{2\pi a}{2.744}.$$

The forgoing examples are simply meant to illustrate that regardless of shape, each energy application zone may have at least one resonant dimension.

Consistent with presently disclosed embodiments, an apparatus or method may involve the use of a source configured to deliver electromagnetic energy to the energy application zone. A "source" may include any component(s) that are suitable for generating and supplying electromagnetic energy. Consistent with the presently disclosed embodiments, electromagnetic energy may be supplied to the energy application zone in the form of propagating electromagnetic waves (also known as electromagnetic radiation) at predetermined wavelengths or frequencies. As used herein, "propagating electromagnetic waves" may include resonating waves, standing waves, evanescent waves, and waves that travel through a medium in any other manner. Electromagnetic radiation carries energy that may be imparted to (or dissipated into) matter with which it interacts.

By way of example, and as illustrated in FIG. 1, the source may include one or more of a power supply 12 configured to generate electromagnetic waves that carry electromagnetic energy. For example, power supply 12 may be a magnetron configured to generate microwave waves at least one predetermined wavelength or frequency. In some embodiments, the magnetron may be configured to generate high power microwaves. Alternatively or additionally, power supply 12 may include a semiconductor oscillator, such as a voltage controlled oscillator, configured to generate AC waveforms (e.g., AC voltage or current) with a controllable frequency. AC waveforms may include sinusoidal waves, square waves, pulsed waves, triangular waves, and/or other types of waveforms with alternating polarities. Additionally or alternatively, a source of electromagnetic energy may include any other power supply, such as electromagnetic field generator, electromagnetic flux generator, or any mechanism for causing electrons to vibrate.

In some embodiments, the apparatus may include at least one modulator 14 configured to modify one or more characteristic parameters of the electromagnetic waves generated by power supply 12, in a controlled manner. The modulator may or may not be part of the source. For example, modulator 14 may be configured to modify one or more parameters of a periodic waveform, including amplitude (e.g., an amplitude difference between different radiating elements), phase, and frequency.

In some embodiments, modulator 14 may include at least one of a phase modulator, a frequency modulator, and an amplitude modulator configured to modify the phase, frequency, and amplitude of the AC waveform, respectively. These modulators are discussed in greater detail later, in connection with FIGS. 5A, 5B, 6, and 7B. In some embodiments, modulator 14 may be integrated as part of power supply 12 or the source, such that the AC waveforms generated by power supply 12 may have at least one of a varying frequency, a varying phase, and a varying amplitude over time.

The apparatus may also include an amplifier 16 for amplifying, for example, the AC waveforms before or after they are modified by modulator 14. The amplifier may or may not be part of the source. Amplifier 16 may be, for example, a power amplifier including one or more power transistors. As another example, amplifier 16 may be a step-up transformer having more turns in the secondary winding than in the primary winding. In other embodiments, amplifier 16 may also be a power electronic device such as an AC-to-DC-to-AC converter. Alternatively or additionally, amplifier 16 may include any other device(s) or circuit(s) configured to scale up an input signal to a desired level.

The apparatus may also include at least one radiating element 18 configured to transmit the electromagnetic energy to object 50. Radiating element 18 may include one or more waveguides and/or one or more antennas (also known as power feeds) for supplying electromagnetic energy to object 50. For example, radiating element 18 may include slot antennas. Additionally or alternatively, radiating element 18 may include waveguides or antennas of any other kind or form, or any other suitable structure from which electromagnetic energy may be emitted.

Power supply 12, modulator 14, amplifier 16, and radiating element 18 (or portions thereof) may be separate components or any combination of them may be integrated as a single component. Power supply 12, modulator 14, amplifier 16, and radiating element 18 (or portions thereof) may be parts of the source. For example, a magnetron may be used as power supply 12 to generate electromagnetic energy, and a waveguide may be physically attached to the magnetron for transmitting the energy to object 50. Alternatively or additionally, the radiating element may be separate from the magnetron. Similarly, other types of electromagnetic generators may be used where the radiating element may be for example physically separate from- or part of the generator or otherwise connected to the generator.

In some embodiments, more than one radiating element may be provided. The radiating elements may be located on one or more surfaces defining the energy application zone. Alternatively, radiating elements may be located inside and/or outside the energy application zone. When the radiating elements are located outside the zone, they may be coupled to elements that would allow the radiated energy to reach the energy application zone. Elements for allowing the radiated energy to reach the energy application zone may include, for example, wave guides and/or antennas. The orientation and configuration of each radiating element may be distinct or the same, as may be required for obtaining a target goal, for example, application of a desired energy distribution in the energy application zone. Furthermore, the location, orientation, and/or configuration of each radiating element may be predetermined before applying energy to object 50, or dynamically adjusted using a processor while applying energy. The invention is not limited to radiating elements having particular structures or which are necessarily located in particular areas or regions. In some embodiments, radiating elements may be placed in certain places, or the amplitudes of waves emitted from different radiating elements may be selected in accordance with the location, orientation, and/or configuration of the radiating elements.

One or more of radiating element(s) 18 may be configured to receive electromagnetic energy, optionally, in addition to radiating electromagnetic energy. In other words, as used herein, the term "radiating element" broadly refers to any structure from which electromagnetic energy may radiate and/or by which electromagnetic energy may be received, regardless of whether the structure was originally designed for the purposes of radiating or receiving energy, and regardless of whether the structure serves any additional function. Thus, an apparatus or method consistent with presently disclosed embodiments may involve the use of one or more detectors configured to detect signals associated with electromagnetic waves received by the one or more radiating elements. For example, as shown in FIG. 1, a detector 40 may be coupled to radiating elements 18 that, when functioning as receivers, receive electromagnetic waves from cavity 20.

As used herein, the term "detector" may include an electric circuit that measures one or more parameters associated with electromagnetic waves. For example, such a detector may include a power meter configured to detect a level of the power associated with the incident, reflected and/or transmitted electromagnetic wave (also known as "incident power," "reflected power," and "transmitted power", respectively), an amplitude detector configured to detect an amplitude of the wave, a phase detector configured to detect a phase of the wave respective to a predefined reference point, a phase difference between waves simultaneously emitted by two radiating elements, or other phase difference, a frequency detector configured to detect a frequency of the wave, and/or any other circuit suitable for detecting a characteristic of an electromagnetic wave.

Incident power may be supplied from the source to a radiating element for emitting the power into the energy application zone 20. Of the incident power, a portion may be dissipated by the object (referred to herein as "dissipated power"). Another portion may be reflected at the radiating element (referred to herein as "reflected power"). Reflected power may include, for example, power reflected back to the radiating element via the object and/or the energy application zone. Reflected power may also include power retained by the port of the radiating element (e.g., power that is emitted by the antenna but does not flow into the zone). The rest of the incident power, other than the reflected power and dissipated power, may be transmitted to one or more radiating element functioning as receivers (referred to herein as "transmitted power"). Energy may also leak to other places, such as into the walls of the cavity, through the door, etc. For simplicity, these portions of the energy are not discussed herein. In some embodiments, it may be estimated that these portions of the energy are substantially low and may be negligible.

In some embodiments, the detector may be a directional coupler, configured to allow signals to flow from the amplifier to the radiating elements when the radiating elements function as transmitters (e.g., when the radiating elements radiate energy), and to allow signals to flow from the radiating elements to the amplifier when the radiating elements function as receivers (e.g., when the radiating element receive energy). Additionally or alternatively, the directional coupler may be further configured to measure the power of a flowing signal. In some embodiments, the detector may also include other types of circuits that measure the voltage and/or current at the ports.

Consistent with some presently disclosed embodiments, the source may be configured to deliver electromagnetic energy at a predetermined wavelength, denoted as $\lambda_1$, to the object in the energy application zone, wherein the predetermined wavelength is greater than about one quarter of the largest resonant wavelength supported by the energy application zone, denoted as $\lambda_0$. This relationship between the largest resonant wavelength and the wavelength of the delivered electromagnetic energy, which is expressed as $\lambda_1 \geq \lambda_0/4$, may be referred to as the "modal condition". In other embodiments, a different relationship between the wavelength of the applied electromagnetic energy supplied by the source and the largest resonant wavelength supported by the energy application zone may be applied in order to meet the modal condition. In some embodiments, the modal condition is met when low order modes are excited, e.g., m*n is below 30, 40, or 50 (wherein m and n are integers representing the mode number in different axes, e.g., x and y). The source is not necessarily limited to configurations that supplies electromagnetic energy at a single predetermined wavelength. Optionally, the source may be configured to supply electromagnetic energy to cavity 20 at a set of wavelengths, which may be determined before energy application begins. When the source supplies energy to the cavity at varying frequencies, the largest wavelength among which may be denoted $\lambda_1$, and the modal condition may be characterized as $\lambda_1 \geq \lambda_0/4$. In some embodiments, $\lambda_1$ may also have an upper limit, for example, it may be smaller or equal $\lambda 0$.

Alternatively, the modal condition may be expressed in terms of frequency. Because there is a relationship between wavelengths $\lambda_1$ and $\lambda_0$ and their corresponding frequencies $f_1$ and $f_0$, such that $f_1 = c/\lambda_1$ and $f_0 = c/\lambda_0$, the modal condition, $\lambda_1 \geq \lambda_0/4$, may be expressed as $f_1 \leq 4f_0$, that is, to operate within the modal condition, the electromagnetic energy may be applied at a frequency that is lower than about four times the lowest resonance frequency in the energy application zone.

In addition, because the largest resonant wavelength $\lambda_0$ has a unique relationship with the dimensions of the energy application zone, the modal condition may also be expressed as a relationship between the dimension(s) of the energy application zone and the applied wavelength $\lambda_1$. For example, for a rectangular cavity 20 having length, width, and height, a, b, and c respectively, and wherein a>b>c, the modal condition may be expressed as $$\lambda_1 \geq \frac{ab}{2\sqrt{a^2+b^2}}$$

As another example, for a cubic cavity having dimensions a×a×a, the modal condition may be expressed as $$\lambda_1 \geq \frac{\sqrt{2}\,a}{4}.$$

As another example, for spherical cavity having radius a, the modal condition may be expressed as $$\lambda_1 \geq \frac{\pi a}{3.733}.$$

A cavity whose dimensions satisfy the "modal condition" in respect of electromagnetic energy supplied to the cavity, is referred to herein as a "modal cavity."

By its nature, an electromagnetic field tends to be distributed in an uneven field pattern in the energy application zone. That is, a spatial distribution of electric field intensity in the energy application zone may be uneven. A field pattern may be substantially stable in space over time, or spatially varying over time. The manner by which the field pattern varies over time may be known. A field pattern may result in areas with relatively high amplitude of electrical field intensity (corresponding to maxima or minima in the field amplitude) which are referred to herein as "hot spots." Examples of hot spots are illustrated by the shaded regions in FIGS. 3A-3D. A field pattern may also result in areas with relatively low amplitude of electrical field intensity (e.g. zero or near zero field values), referred to herein as "cold spots." Examples of cold spots are illustrated by the non-shaded areas in FIGS. 3A-3D. It is hereby noted that while hot spots are diagrammatically illustrated in the figures as having a clear and defined border, in reality the intensity changes in a more gradual manner between hot spots and cold spots. In fact, energy transfer to the object may occur in all regions of the object that coincide with regions of the field pattern, where the field pattern has non-zero field intensity and is not necessarily limited to areas coinciding with hot spots, The extent of heating the object may depend, among other things, on the intensity of the field to which the object is exposed and the duration of exposure.

The field pattern itself may be a function of many factors (as discussed later), including for example the physical characteristics and dimensions of the energy application zone. The relatively high amplitude of electrical field intensity in a hot spot may be higher than a first threshold and the relatively low amplitude of electrical field intensity in a cold spot may be lower than a second threshold. The first threshold may be the same or different from the second threshold. In FIGS. 3A-3B, the first and second thresholds are the same. In some embodiments, the thresholds may be predetermined such that field intensity lower than one of the thresholds may not effectively apply energy to the object. For example, the second threshold may be selected as being close to the minimum value of the field intensity. As used herein, the term "amplitude" is interchangeable with "magnitude."

In the energy application zone, a particular region may be covered by the relatively high amplitude of electrical field intensity (hot spots) of some field patterns, and relatively low amplitude of electrical field intensity (cold spots) of some other field patterns. Field patterns may be selectively chosen to target energy delivery to selected regions of the energy applications zone. For example, if energy needs to be applied to a first region but not a second region in the energy application zone, one or more field patterns may be selected in which hot spots of these filed patterns substantially coincide with the first region and cold spots substantially coincide with the second region. Therefore, consistent with some presently disclosed embodiments, the source may be configured to deliver electromagnetic energy in one or more field patterns having hot and cold spots in predetermined areas of the energy application zone. In some embodiments, the controller may regulate the source to apply energy using such field patterns to achieve a target energy distribution. In modal cavity 60, as illustrated in FIGS. 3A and 3B, field patterns may be excited such that each has a plurality of areas with high amplitudes of intensity (hot spots) 62 and 64 (shaded areas) and areas with low amplitudes of intensity (cold spots; non-shaded areas).

Some of the field patterns excitable in an energy application zone are named "modes". Modes form a set of special field patterns that are linearly independent from each other and orthogonal to one another. As referred herein, two field patterns are orthogonal to each other if the integral of the scalar product of the two fields associated with the two modes over the energy application zone is zero. A mode or a combination of modes (e.g., a general field pattern), can be of any known type, including propagating, evanescent, and resonant. In some embodiments, the excited field pattern includes a combination of modes.

In FIGS. 3A and 3B, objects 66 and 68 are placed in energy application zone 60. If one desires to apply energy only to object 66 and to avoid applying energy to object 68, the field pattern of FIG. 3A may be chosen. Alternatively, if there is a desire to apply energy to object 68 and to avoid applying energy to object 66, the field pattern of FIG. 3B may be chosen.

Any field pattern that may be excited in an energy application zone and may be represented mathematically as a linear combination of modes. The modes may include an infinite number of evanescent modes and a finite number of propagating modes (some of which may be resonant modes). In general, fewer propagating modes may be excited in a modal cavity than in a non-modal cavity. In other words, a modal cavity may support, in general, fewer propagating modes than a non-modal cavity. Again, some of the supported propagating modes may be resonant modes. By nature, the evanescent modes have a very small percent of power (or energy) out of the total power (or energy) used to excite the field pattern, and the vast majority of the total power (and energy) is carried by propagating modes.

As explained in more detail below, in some embodiments, one or more radiating elements may be placed such that some undesired modes may be rejected. For example, two or more propagating modes may be effectively excited in an energy application zone by a single frequency. If the radiating element emitting an electromagnetic wave at that frequency is positioned at a null of one of the modes (i.e. at a location wherein one of the modes has zero field), this mode may be eliminated (i.e., rejected).

The modal condition and the corresponding modal cavity (i.e. a cavity which meets the modal condition) may exhibit advantages in controlling field patterns, or more specifically, modes, in the energy application zone. As discussed above, in a modal cavity, the number of propagating modes may be fewer than that in a non-modal cavity. Therefore, control of these propagating modes may be relatively easier, as the number and density of antennas used to eliminate undesired modes may be lower if the modal condition is met. Moreover, minor inaccuracies in control may have a less prominent overall effect on the hot spot selection in a modal cavity than in a non-modal cavity, where a relatively higher number of modes may require finer control in order to achieve a condition in which one propagating mode is excited and others are not.

In one respect, an aspect of the invention may involve employing a certain combination of variable parameters (referred to herein as MSE) that may affect the field pattern excited in the energy application zone, in order to purposefully achieve cold spots (e.g., areas having relatively low amplitude of electrical field intensity) in specified areas in the energy application zone. These areas then permit controlled application of energy because when it is desired to avoid applying energy to a portion of an object, that portion may be aligned with a cold spot. Alternatively, the device may be operated such that an electromagnetic field is excited that has a hot spot (e.g., relatively high amplitude of electrical field intensity) aligned with a portion of an object where it is desired to apply energy. For example, by choosing to excite the field pattern as shown in FIG. 3A, one may heat object 66 and avoid heating object 68, while by choosing to excite the field pattern as shown in FIG. 3B one may heat object 68 and avoid heating object 66. Thus, when it is desired to apply energy to a portion of an object in an energy application zone, a higher intensity area of a field pattern may be aligned with that portion of the object. While the modal condition may be used in combination with MSE control, the modal condition may also provide benefits even if not used with MSE control, and conversely, MSE control may be applied even if the modal condition is not met.

If a user desires to apply twice the amount of energy to object 66 than to object 68, the field patterns of both FIG. 3A and FIG. 3B may be used, with the former being applied for double the amount of time at the same power level, at double the power level for the same amount of time, or for any other time/power pair that corresponds supplying twice the energy via the field pattern of FIG. 3A than via the field pattern of FIG. 3B (assuming that the fields have similar intensities in the shaded areas). If the field intensities differ in the shaded areas, the difference may be taken into account in order to achieve a desired energy application profile in the energy application zone or the object, e.g., a desired energy absorption distribution in the energy application zone or the object.

When two field patterns are excited sequentially, the time average of the field patterns formed in the energy application zone may be represented as the sum of the two excited field patterns. If the field patterns are excited simultaneously, interference may occur, and the time average may be different from the sum. However, if the two field patterns are orthogonal to each other (e.g., modes), sequential and simultaneous application may each have the same result.

In order to control the amounts of energy that are applied to two different regions, it may be desirable to first determine the energy absorption characteristics of the two regions. Differing regions in the energy application zone may have differing energy absorption characteristics. For example in a situation where bread and vegetables are heated by RF energy, a region consisting mostly of bread may be less absorptive than another region consisting mostly of vegetables. In another example, a bread portion that coincides only with a field pattern characterized by a first frequency may have different energy absorption characteristics than a second bread portion, which coincides only with a field pattern, characterized by a second frequency, different from the first.

In some embodiments, an apparatus or method of the invention may involve one or more processors configured to determine the energy absorption characteristics of any given object placed at least partially in the energy application zone. Determination of the energy absorption characteristics may be accomplished through feedback (e.g., via reflection, as discussed later in greater detail). Alternatively, in situations where absorptive characteristics of object(s) in the energy application zone are already known, an apparatus consistent with presently disclosed embodiments need not determine energy absorptive characteristics. Rather, related information may be preprogrammed or otherwise provided to the processor, for example, using machine readable tags.

As used herein, the term "processor" may include an electric circuit that executes one or more instructions. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The instructions executed by the processor may, for example, be pre-loaded into the processor or may be stored in a separate memory unit such as a RAM, a ROM, a hard disk, a optical disk, a magnetic medium, a flash memory, other permanent, fixed, or volatile memory, or any other mechanism capable of providing instructions to the processor. The processor(s) may be customized for a particular use, or can be configured for general-purpose use and perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

A single or multiple processors may be provided for the sole purpose of determining a distribution of energy absorption characteristics across the energy application zone. Alternatively, a single or multiple processors may be provided with the function of determining the energy absorption characteristics in addition to providing other functions. For example, the same processor(s) may also be used to regulate the source or be integrated into a control circuit that provides additional control functions to components other than the source.

Consistent with presently disclosed embodiments, the at least one processor may be configured to apply a plurality of electromagnetic field patterns to the object in the energy application zone. The term "field pattern" may refer to a spatial distribution of electrical field intensity in the energy application zone. A field pattern may be substantially stable in space over time, or spatially varying over time. The manner in which the field pattern varies over time may be known. The pattern in which the energy is distributed may be a function of the physical characteristics of the energy application zone; controllable aspects of the energy source; the type, configuration, orientation, and/or placement of the radiating elements; the presence of field altering structures (e.g., field adjusting elements and/or dielectric lenses); and any other variable that may affect the field pattern. A field adjusting element may be any element that may be controlled to affect the field excited in the energy application zone (e.g., in a way that selectively directs the electromagnetic energy from one or more of radiating elements into the object).

By regulating source-related variables, including one or more of frequency, phase, relative amplitude, antenna selection, and/or antenna orientation, the processor may be able to cause a plurality of differing field patterns to be applied to the energy application zone and/or an object within the zone. Similarly, the processor may be able to cause a plurality of differing field patterns by other variables such as through the adjustment of FAEs (field adjusting elements); adjusting dielectric lenses; or by other means. All such controllable variables/parameters/methods, and/or the combination of them, which may achieve a predetermined set of field patterns in the energy application zone, are referred to herein as a "modulation space" or "MS".

The term "modulation space" or "MS" is used to collectively refer to all the parameters that may affect a field pattern in the energy application zone and all combinations thereof. In some embodiments, the "MS" may include all possible components that may be used and their potential settings (either absolute or relative to others) and adjustable parameters associated with the components. For example, the "MS" may include a plurality of variable parameters, the number of antennas, their positioning and/or orientation (if modifiable), the useable bandwidth, a set of all useable frequencies and any combinations thereof, power settings, phases, etc. The MS may have any number of possible variable parameters, ranging between one parameter only (e.g., a one dimensional MS limited to frequency only or phase only—or other single parameter), two or more dimensions (e.g., varying frequency and amplitude together within the same MS), or many more.

Examples of energy application zone-related factors that may affect the modulation space include the dimensions and shape of the energy application zone and the materials from which the energy application zone is constructed. Examples of energy source-related factors that may affect the modulation space include amplitude, frequency, and phase of energy delivery. Examples of radiating element-related factors that may affect the modulation space include the type, number, size, shape, configuration, orientation and placement of the radiating elements.

Figure 4:
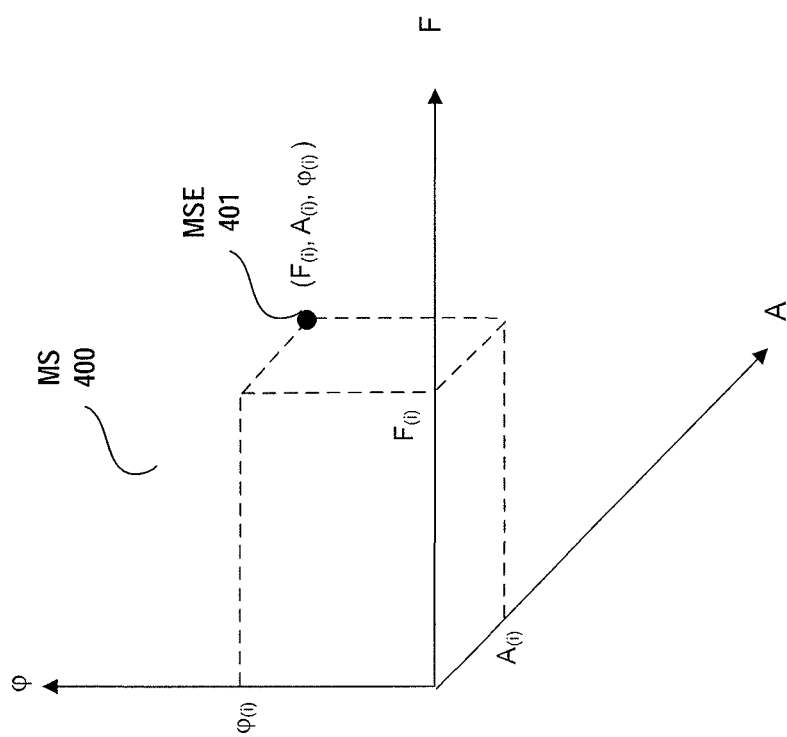
FIG. 4 illustrates an exemplary modulation space consistent with some embodiments of the invention.

Each variable parameter associated with the MS may be thought of as an MS dimension. By way of example, FIG. 4 illustrates a three dimensional modulation space 400, with the three dimensions designated as frequency (F), phase ($\phi$), and amplitude (A). That is, in MS 400, frequency, phase, and amplitude of the electromagnetic waves may be modulated during energy application, while all the other parameters may be predetermined and fixed during energy application. An MS may also be one dimensional where only one parameter is varied during the energy application, or may contain many dimensions that are varied. In FIG. 4, the modulation space is depicted in three dimensions for ease of discussion only. The MS may have many more dimensions.

The term "modulation space element" or "MSE" may refer to a specific set of values of the variable parameters in MS. For example, FIG. 4 illustrates an MSE 401 in the three-dimensional MS 400. MSE 401 has a specific frequency F(i), a specific phase φ (i), and a specific amplitude A(i). If even one of these MSE variables change, then the new set defines another MSE. For example, (3 GHz, 30°, 12 V) and (3 GHz, 60°, 12 V) represent two different MSEs, because the phase component changes. Thus, if an MSE can be visualized as a point in the modulation space, then the aggregate of all MSEs define the modulation space. Differing combinations of these MS elements may lead to differing field patterns across the energy application zone and differing energy distribution patterns in the object. For example, two MSEs may differ one from another in the relative amplitudes of the energy being supplied to a plurality of radiating elements, and these differences may result in differing field patterns. A plurality of MSEs may be executed sequentially or simultaneously to excite a particular field pattern in the energy application zone.

The sequential (and/or simultaneous) choice of MSEs may be referred to as an "energy delivery scheme." For example, an energy delivery scheme may consist of three MSEs (F(1), φ(1), A(1)), (F(2), φ(2), A(2)), (F(3), φ(3), A(3)). Since there are a virtually infinite number of MSEs, there are a virtually infinite number of different energy delivery schemes, resulting in virtually infinite number of differing field patterns in any given energy application zone (although different MSEs may at times cause highly similar or even identical field patterns). Of course, the number of differing energy delivery schemes may be, in part, a function of the number of MSEs that are available. The invention is not limited to any particular number of MSEs or MSE combinations. Rather, the number of options that may be employed could be as few as two or as many as the designer desires, depending on factors such as intended use, level of desired control, hardware or software resolution and cost. For example, exciting a larger number of differing field patterns, which may allow a more subtle design of a field pattern in the energy application zone, may require a larger number of MSEs. In such cases, at least 3 MSEs may be required, for example, 3, 4, or 5 MSEs. In some embodiments, the number of MSEs is very large, but only few of them are used for excitation. For example, 400 different frequencies may be available, and in a given energy application cycle only 5 of them may be used. These five frequencies may be, for example, MSEs that cause the excitation of different resonating modes in the energy application zone.

With the possible MSE selections, the processor may determine a set of suitable MSEs depending on particular application. For example, a predetermined set of field patterns may be selectively chosen and applied to the energy application zone using selected MSEs, such that a particular region may be covered by high field intensity areas of one field pattern but by low field intensity areas of another. For example, object 66 is covered by the high field intensity areas of the field pattern of FIG. 3A but by the low field intensity areas of the field pattern of FIG. 3B. Therefore, when energy absorbed in connection with the field pattern of FIG. 3A is measured, the measurement may be indicative of energy absorption characteristics of object 66. Likewise, a measurement of energy absorbed in connection with the field pattern of FIG. 3B may be indicative of energy absorption characteristics of object 68.

The apparatus of FIG. 1 may be configured to regulate the source to form a set of different MSEs and apply their corresponding field patterns to the energy application zone. Consistent with some embodiments, such regulation may occur through the selection and control of "MSEs". Since a particular field pattern corresponds to one or more controllable variables (e.g., MSEs), the processor may be configured to alter MSEs in order to achieve differing field patterns in the energy application zone.

For example, as depicted in FIG. 1, an exemplary processor 30 may be electrically coupled to various components of the source, such as power supply 12, modulator 14, amplifier 16, and radiating elements 18. Processor 30 may be configured to execute instructions that regulate one or more of these components. For example, processor 30 may regulate the level of power supplied by power supply 12. Alternatively or additionally, processor 30 may regulate the amplification ratio of amplifier 16, by switching the transistors in the amplifier. Alternatively or additionally, processor 30 may perform pulse-width-modulation control of amplifier 16 such that the amplifier outputs a desired waveform. Processor 30 may regulate modulations performed by modulator 14. In another example, processor 30 may alternatively or additionally regulate at least one of location, orientation, and configuration of each radiating element 18, such as through an electro-mechanical device. Such an electromechanical device may include a motor or other movable structure for rotating, pivoting, shifting, sliding or otherwise changing the orientation or location of one or more radiating elements 18. Processor 30 may be further configure to regulate any field adjusting elements located in the energy application zone, in order to change the field pattern in the zone. For example, field adjusting elements may be configured to selectively direct the electromagnetic energy from the radiating element, or to simultaneously match the radiating element that acts as a transmitter to reduce coupling to the other radiating elements that act as receivers. Alternatively or additionally, processor 30 may selectively distribute energy between radiating elements and/or may selectively use only a subset of available radiating elements.

The processor may regulate one or more components of the source and parameters associated with the components, according to a predetermined scheme. For example, when a phase modulator is used, it may be controlled to perform a predetermined sequence of time delays on an AC waveform emitted by a radiating element, such that the phase of the AC waveform is increased by a number of degrees (e.g., 10 degrees) for each of a series of time periods. Alternatively or additionally, the processor may dynamically and/or adaptively regulate modulation based on feedback from the energy application zone. For example, processor 30 may be configured to receive an analog or digital feedback signal from detector 40, indicating an amount of electromagnetic energy received from cavity 20, and processor 30 may dynamically determine a time delay at the phase modulator for the next time period based on the received feedback signal.

The processor may also be configured to regulate a frequency modulator in order to alter a frequency of at least one electromagnetic wave supplied to the energy application zone. Such a frequency modulator may be configured to adjust the frequency of an AC waveform. By way of example, the frequency modulator may be a semiconductor oscillator, such as oscillator 22 diagrammatically depicted in FIG. 5A, and configured to generate an AC waveform oscillating at a predetermined frequency. The predetermined frequency may be in association with an input voltage, current, or other analog or digital signals. For example, a voltage controlled oscillator may be configured to generate waveforms at frequencies proportional to the input voltage.

Consistent with some embodiments, processor 30 may be configured to regulate oscillator 22 to generate AC waveforms of time-varying frequencies. The AC signal may be amplified by amplifier 24 and cause antennas 32 and 34 to excite frequency modulated electromagnetic waves in cavity 20.

Processor 30 may be configured to regulate oscillator 22 to sequentially generate AC waveforms oscillating at various frequencies within a predetermined frequency band. This sequential process may be referred to as "frequency sweeping." More generally, processor 30 may be configured to regulate the source to sequentially generate waveforms at various MSEs, e.g. at various frequencies, phases, amplitudes, and/or selections of radiating elements. Such a sequential process may be referred as "MSE sweeping". Sequentially swept MSEs may not necessarily be related to each other. Rather, their MSE variables may differ significantly from MSE to MSE (or may be logically related). In some embodiments, the MSE variables may differ significantly from MSE to MSE, possibly with little or no logical relation among them, however in the aggregate, a group of working MSEs may achieve a desired energy application goal.

In frequency sweeping, each frequency may be associated with a feeding scheme (e.g., a particular MSE, being a particular combination of elements and their settings). In some embodiments, based on the feedback signal provided by detector 40, processor 30 may be configured to select one or more frequencies from the frequency band, and regulates oscillator 22 to sequentially generate AC waveforms at these selected frequencies.

Alternatively or additionally, processor 30 may be configured to regulate amplifier 24 to adjust amounts of energy delivered via antennas 32 and 34, based on the feedback signal. Consistent with some embodiments, detector 40 may detect an amount of energy reflected from the energy application zone at a particular frequency, and processor 30 may be configured to cause the amount of energy applied at that frequency to be high when the reflected energy is high. That is, processor 30 may be configured to cause one or more antennas to apply energy at a particular frequency over a longer duration when the reflected energy is high at that frequency. Alternatively, processor 30 may be configured to cause one or more antennas to apply energy at a particular frequency over a longer duration when the reflected energy is low at that frequency. For example, when the reflected energy measured indicates that an object is present with relatively low absorption characteristics (e.g., ice) it may be desirable to apply more energy at that frequency. Other relationships between amounts of reflected and applied energy may also be used.

Figure 5A:
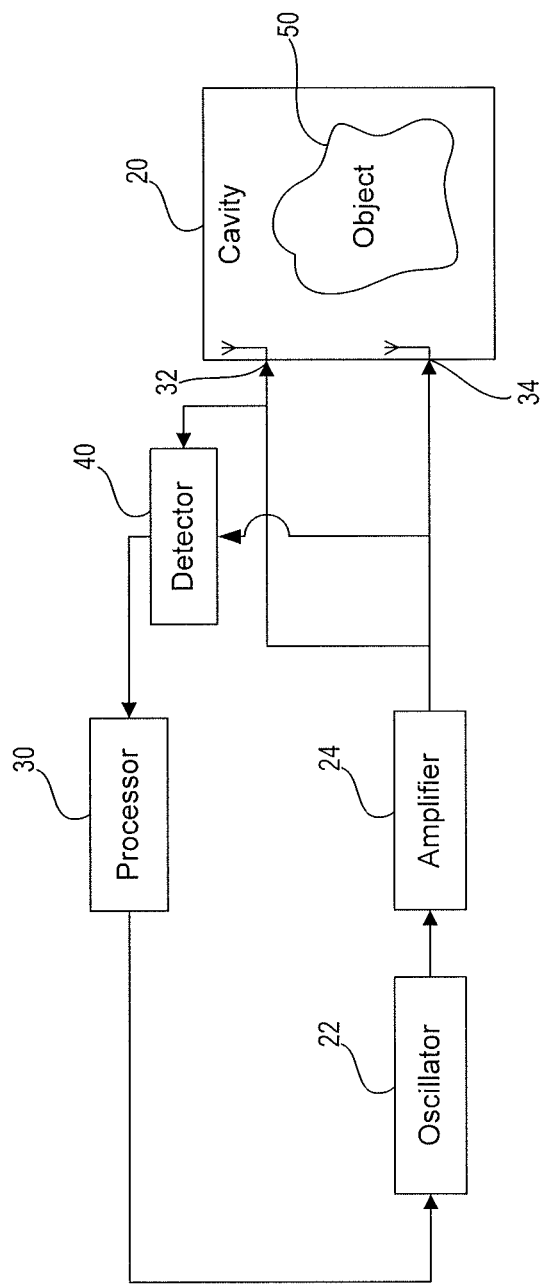
FIG. 5A is a schematic diagram of an apparatus configured to perform frequency modulation on electromagnetic waves supplied to an energy application zone, in accordance with some embodiments of the invention.
Figure 5B:
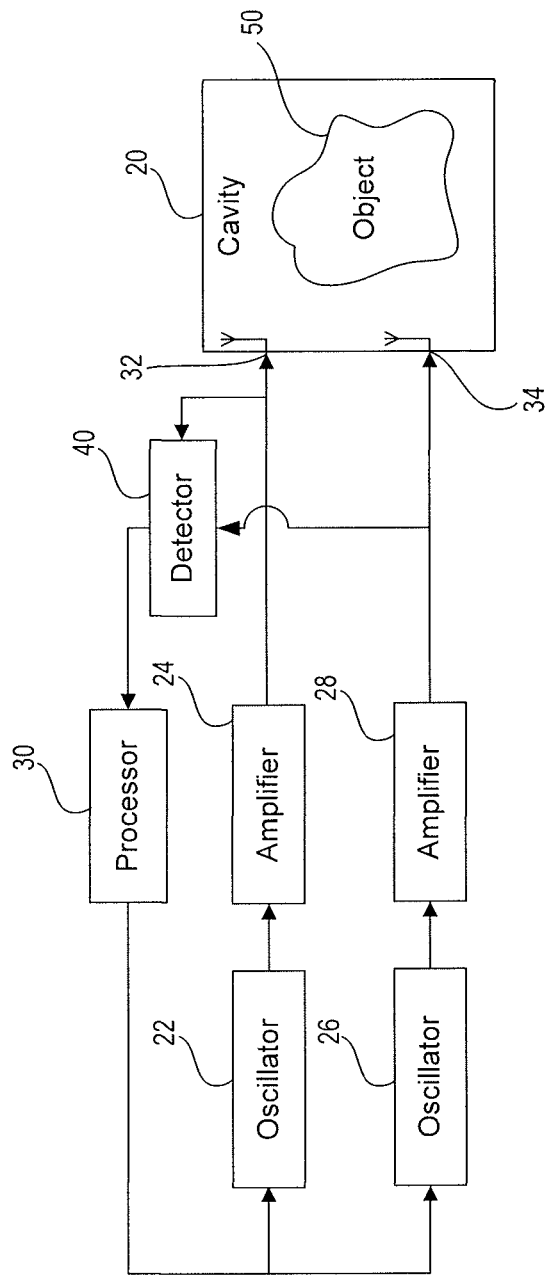
FIG. 5B is another schematic diagram of an apparatus configured to perform frequency modulation on electromagnetic waves supplied to the energy application zone, in accordance with some embodiments of the invention.

As depicted in FIG. 5B, some embodiments of the invention may include more than one oscillator, such as oscillators 22 and 26 for generating AC waveforms of differing frequencies. The separately generated AC waveforms may be amplified by amplifiers 24 and 28, respectively. Accordingly, at any given time, antennas 32 and 34 may be caused to simultaneously apply electromagnetic waves at two differing frequencies to cavity 20. Each of these two frequencies may be time-varying. FIG. 5B illustrates two oscillators for exemplary purposes only, and it is contemplated that more than two oscillators (and/or more than two amplifiers and/or more than two antennas) may be used.

The processor may be configured to regulate a phase modulator in order to alter a phase difference between two electromagnetic waves supplied to the energy application zone. By way of example, the phase modulator may include a phase shifter, such as phase shifter 54, illustrated in FIG. 6. Phase shifter 54 may be configured to cause a time delay in the AC waveform in a controllable manner within cavity 20, delaying the phase of an AC waveform anywhere from between 0-360 degrees. Phase shifter 54 may include an analog phase shifter configured to provide a continuously variable phase shift or time delay, or phase shifter 54 may include a digital phase shifter configured to provide a discrete set of phase shifts or time delays.

Figure 6:
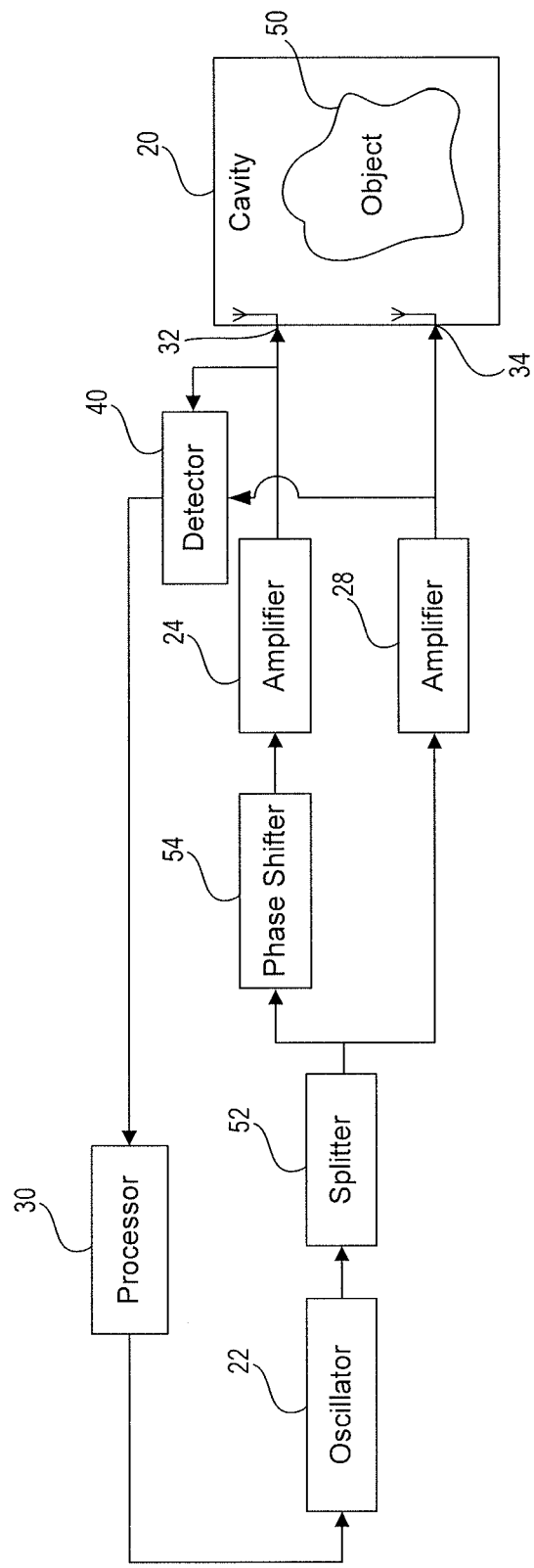
FIG. 6 is a schematic diagram of an apparatus configured to perform phase modulation on electromagnetic waves supplied to an energy application zone, in accordance with some embodiments of the invention.

Consistent with some embodiments such as is illustrated in FIG. 6, a splitter 52 may be provided to split the AC signal generated by oscillator 22 into two AC signals (e.g., split signals). Processor 30 may be configured to regulate phase shifter 54 to sequentially cause various time delays such that the phase difference between the two split signals may vary over time. This sequential process may be referred to as "phase sweeping."

The processor may be configured to regulate an amplitude modulator in order to alter an amplitude of at least one electromagnetic wave supplied to the energy application zone. By way of example, the amplitude modulator may include a mixer circuit, such as mixer 42 illustrated in FIG. 7A, configured to regulate an amplitude of a carrier wave with another modulating signal. The modulated signal (e.g., the output of mixer 42) may be amplified by amplifiers 44.

Figure 7A:
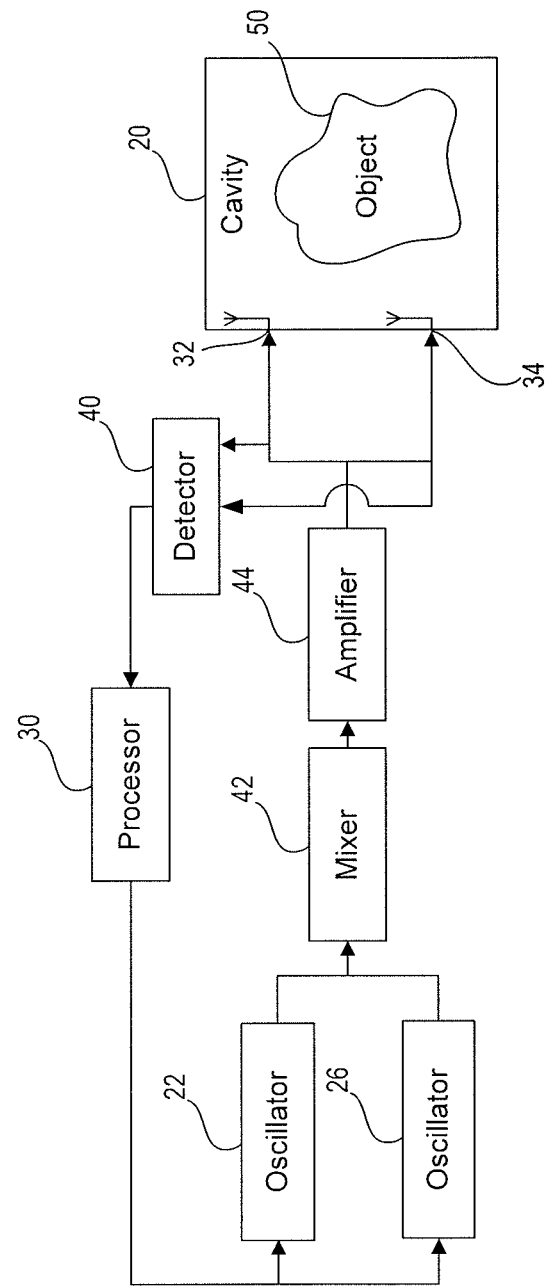
FIG. 7A is a schematic diagram of an apparatus configured to perform amplitude modulation on electromagnetic waves supplied to an energy application zone, in accordance with some embodiments of the invention.
Figure 7B:
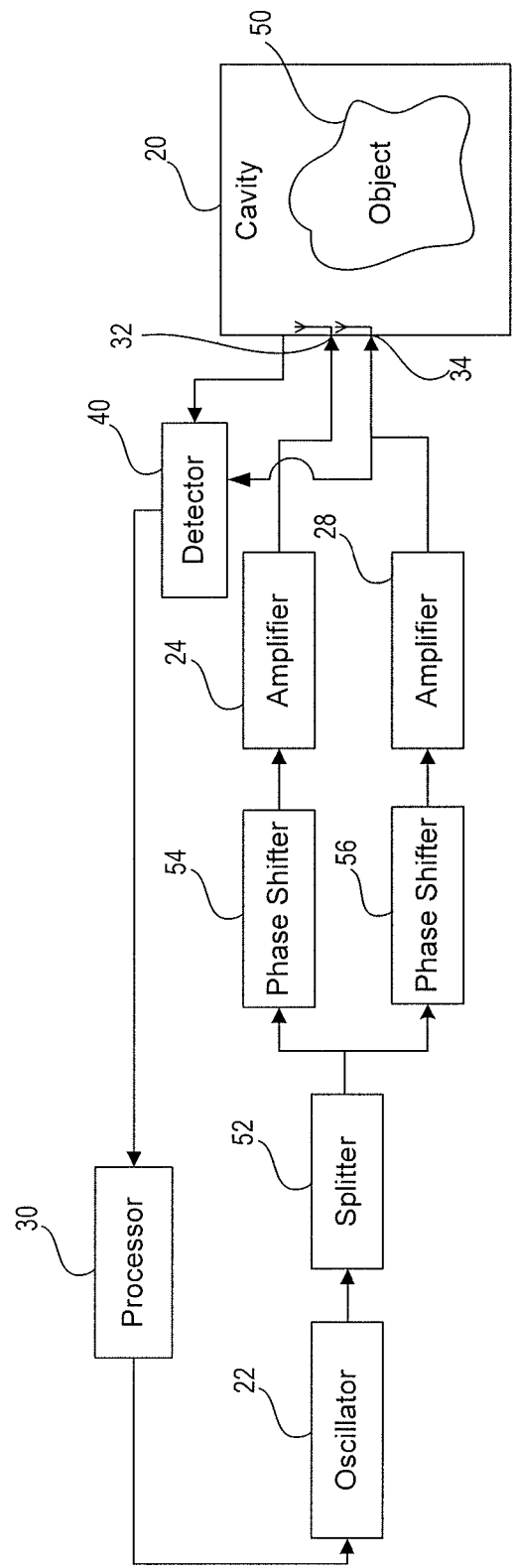
FIG. 7B is another schematic diagram of an apparatus configured to perform amplitude modulation on electromagnetic waves supplied to an energy application zone, in accordance with some embodiments of the invention.

Consistent with some embodiments, the amplitude modulator may include one or more phase shifters, such as phase shifters 54 and 56, as shown in FIG. 7B. Amplitude modulation may be implemented by combining two or more phase shifted electromagnetic waves. For example, splitter 52 may split the AC signal generated by oscillator 22 into two AC signals, such as sinusoidal waves cos [$\phi$t]. Because they are split from a single signal, the two split AC signals may share substantially the same frequency. One split AC signal may be shifted by phase shifter 54 for phase α, so that the AC signal becomes cos [$\phi$t+α]. The other split AC signal may be shifted by phase shifter 56 for phase −α (or equivalently 360°−α), so that the AC signal becomes cos [$\phi$t−α].

As illustrated in FIG. 7B, the phased shifted AC signals may be amplified by amplifier 24 and 28 respectively, and in this manner, antennas 32 and 34 may be caused to excite electromagnetic waves having a shared AC waveform. Antennas 32 and 34 may be positioned at predetermined positions, so that the two electromagnetic waves excited by the antennas may be combined to form an amplitude modulated wave, according to the trigonometric identity cos [$\phi$t−α]+cos [$\phi$t+α]=2 cos(α) cos($\phi$t).

Although for ease of discussion FIGS. 5A-5B, FIG. 6 and FIG. 7A-7B illustrate circuits for altering frequency, phase, and amplitude modulations individually it is contemplated that components of these circuits may be combined in order to enable multiple combinations, thereby providing a larger modulation space. Moreover, many radiating elements may be employed, and differing wave patterns may be achieved through the selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. Optionally, any modulation may be performed with any combinations of radiating elements (e.g., each having a different phase, and/or a different amplitude and/or a different frequency). Alternatively, amplitude may be held constant and field changes may be caused by switching between radiating elements. Further, radiating elements 32 and 34 may include a device that causes their location or orientation to change, thereby causing field pattern changes. The combinations are virtually limitless, and the invention is not limited to any particular combination, but rather reflects the notion that field patterns may be altered by altering one or more of the parameters in the modulation space (MS), thereby varying MSEs As previously discussed, the processor may play a role in causing a plurality of electromagnetic field patterns to be applied to an object through regulation of variables that alter MSEs, and hence alter the field pattern applied. For example, the field patterns may be predicted based on the MSEs selected. This prediction may be possible as the result of testing, simulation, and/or analytical calculation. The resulting predictability permits a set of MSEs to be chosen in order to achieve a desired energy application profile.

Using the testing approach, sensors (e.g., small antenna) may be placed in an energy application zone, to measure the field distribution that results from a given MSE. The distribution can then be stored in, for example, a look-up table.

In a simulated approach, a virtual model may be constructed so that MSEs can be tested in a virtual manner. For example, a simulation model of an energy application zone may be performed in a computer based on a set of MSEs inputted to the computer. A simulation engine such as CST or HFSS may be used to numerically calculate the field distribution inside the energy application zone. The correlation between MSE and resulting field pattern may be established in this manner. This simulated approach can occur well in advance and the known combinations stored in a look-up table, or the simulation can be conducted on an as-needed basis during an energy application operation, or associated with an energy application operation.

Similarly, as an alternative to testing and simulation, calculations may be performed based on an analytical model in order to predict field patterns based on selected combination of MSEs. For example, given the shape of an energy application zone with known dimensions, the at least one processor may be configured to calculate some basic field patterns corresponding to given MSEs from analytical equations. These basic field patterns, (e.g., "modes" or combination of modes) may then be used to construct an energy delivery scheme, as defined earlier. As with the simulated approach, the analytical approach may occur well in advance and the known combinations stored in a look-up table, or may be conducted on an as-needed basis during or shortly before an energy application operation.

Consistent with some embodiments, the calculation of field patterns may be made without considering the existence of the object. This may be based on the assumption that the existence of object in the energy application zone does not materially change the intensity distribution of the field pattern in the zone (known as the "Born approximation"). The Born approximation may be particularly useful when the location, size and electromagnetic characteristics of the object are unknown before the energy application. When the properties of the object are known before hand, the field pattern calculation may also be made with consideration of the object. Field calculation or simulation may be relatively simple in cases where the load fills the entire energy application zone and is dielectrically homogeneous.

A load maybe considered to fill substantially the entire energy application zone if the load fills at least 90% of the zone. In some embodiments, the load may fill the entire zone except for some excluded space, for example, space containing radiating elements (e.g., RF feeds), detectors, thermometers, or other equipment that may be useful for the operation of the apparatus. Some marginal spaces that are not filled by the object, for example, at corners of a cavity, may also exist in a substantially filled energy application zone.

An example of a homogeneous load is one with no dielectric-boundaries. A dielectric boundary is a line or surface that separates between two regions, each having a significantly different dielectric constant ($\in_r$). A characteristic size of each of the regions may be of the order of at least about a wavelength in vacuum. A difference in loss tangent may be considered significant, for example, if the difference is of about 10%. One example of a homogeneous load is a body of water. It is noted that if different portions of the body of water is at different temperatures, for examples, because of non-uniform heating, the dielectric constant of the different portions may differ. If this difference is larger than 10%, however, the body of water may be considered as inhomogeneous.

A suspension of oil in water (or of any other two materials) may be considered homogeneous, provided that the oil droplets (or particles of other suspended medium) are smaller than the wavelength of the applied MSE, in vacuum. This may be so despite of the large difference in dielectric constant between oil and water.

Another case in which the mode calculation or simulation may be simple, is in case of a separable load. A separable load is a load comprising at least one entire layer of a homogeneous material. The concepts of homogeneity and substantially filling may be understood as explained above. Each layer may be bordered by cavity walls and two parallel cross-sections in a separable cavity. A separable cavity is a cavity where the electrical field excited therein, $E(x, y, z)$ may be expressed as a product of the field in x, y plane by the field in the z direction, i.e. $E(x, y, z)=E(x, y)*E(z)$. Separable cavities include, for example, cavities having a shape of rectangular box, cylinder, prism with a right-angled triangular base, or a sectioned cylinder. An example of a separable load may be, for example, a layered cake, wherein each layer is homogeneous, and touches the cavity wall at the circumference of the cake.

In addition to recording the field patterns corresponding to the MSEs that cause those patterns, the processor may be further configured to record the field distribution of each field pattern corresponding to spatial locations in the energy application zone. The field pattern may be visualized using imaging techniques or stored in a computer as digital data. These records may be useful as input as a basis for loss profile determination by the processor. Loss profile determination may be sometimes facilitated by discretization, as discussed below.

An energy application zone may be discretized, such that a unique address is associated with each discretized subregion, enabling field patterns to be spatially mapped to particular addresses. FIGS. 8A-8C and 9 illustrate examples of discretized energy application zones. The term discretization may, for example, also be referred to as division, separation, or partition.

The discretization of an energy application zone into sub-regions may be predetermined. In one case, a processor may acquire the predetermined discretization information, through, for example, a look up table, information stored in memory, or information encoded in the processor. Alternatively, discretization may occur dynamically using at least one processor 30, for example as illustrated in FIG. 1. For example, when known dimensions of the zone are provided to the processor, the processor may overlay a regular or irregular division pattern on the volume, divide the zone into subregions, and assign an address to each subregion.

Figure 8A:
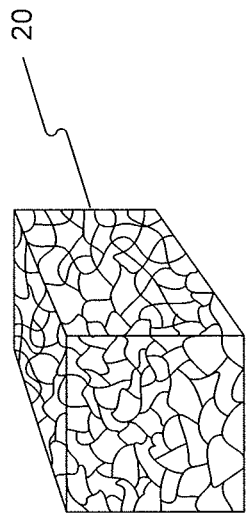
FIGS. 8A-8C illustrate exemplary energy application zone discretization strategies in accordance with some embodiments of the invention.
Figure 8B:
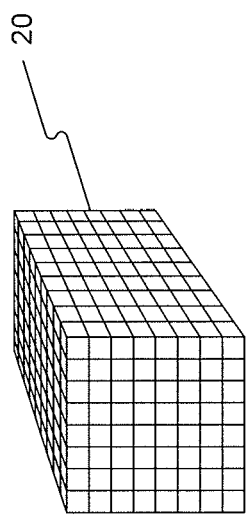

The discretization strategy may depend on many factors, including but not limited to: desired resolution, properties of the loss profile, and available field patterns. The regions may be of a regular or irregular shape. For example, in 3D cases, the regions may be regular cubic- or rectangular-shaped, as illustrated in FIG. 8A. In this case, if the size (e.g., volume) of the zone is SL, and a desired resolution may require the object to include at least 100 regions, then the average size of each region may be, for example, SL/100. Alternatively, the regions may be any irregular-shape depending on particular needs. For example, the energy application zone may be divided into somewhat random regions as shown in FIG. 8B. In some embodiments, the division may occur by taking into account the location of an object in the zone and/or the characteristics of a specific field pattern applied to the zone.

Figure 8C:
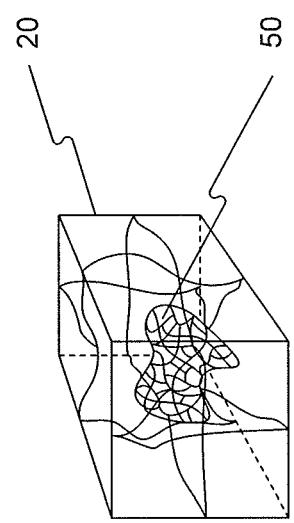

In certain locations of the object or the energy application zone, the size of the divided regions may be smaller than other locations. In other words, the density of regions may vary across the entire object or energy application zone. For example, the dividing strategy may vary depending on whether a region corresponds to a portion of an object in the energy application zone that is targeted for energy application; whether the region corresponds to a region of the zone where no portion of the object is located, or to a region comprising a portion of the object that is not targeted for energy application (each of the two latter regions can be termed "void zone"). In some circumstances, the targeted portion of the object may include the entire object. In some circumstances, a non-occupied portion of the zone may be treated as part of the void zone. According to an exemplary strategy, the entire void zone may be treated as a single region. In another exemplary strategy, the void zone may be divided into a plurality of regions in a similar manner as the targeted portion inside the object. In this case, the dividing may be carried out in the entire energy application zone, regardless of the spatial occupation of the object or the spatial location of the targeted portion of the object. Alternatively, the dividing may be carried out separately for the zone occupied by the targeted portion of the object and the void zone. In yet another example, the void zone may be divided into a plurality of regions in a different manner than that in the targeted portion of the object. For example, the average size of regions in the void zone may be larger than that inside the targeted portion of the object, as illustrated in FIG. 8C. In other words, the density of regions in the void zone may be lower than that inside the targeted portion of the object (e.g., object 50). The illustrations of FIGS. 8A-C are exemplary only. An infinite number of discretization strategies are contemplated within the scope of the invention.

Figure 9:
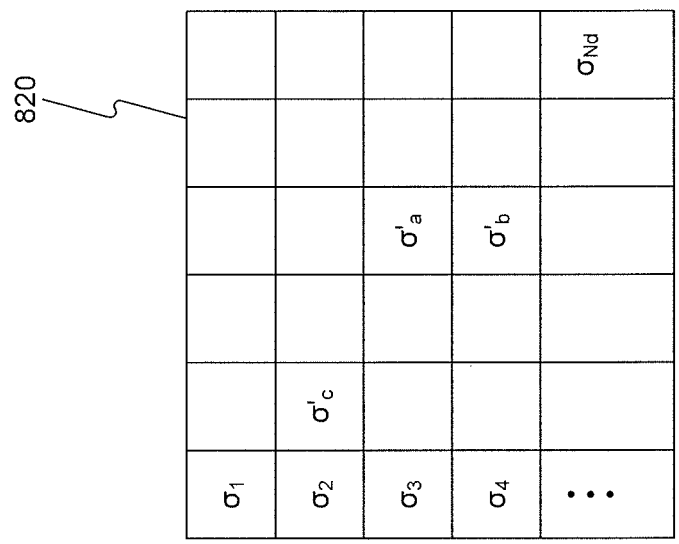
FIG. 9 illustrates an exemplary loss profile in the form of an image, consistent with some embodiments of the invention.
Figure 9:
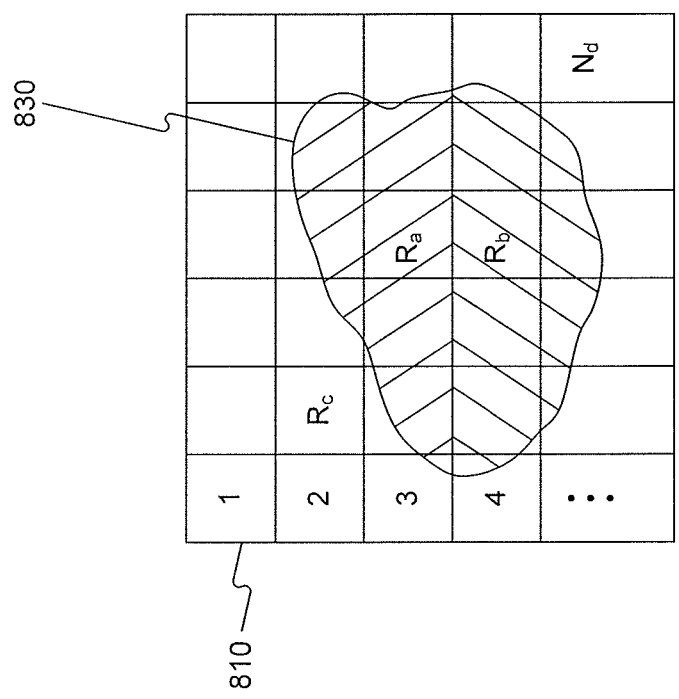

Discretization may occur just within an area occupied by an object, or an entire energy application zone may be discretized. An example of a discretized energy application zone 810 is discussed below in connection with FIG. 9. In FIG. 9, an energy application zone 810 may be divided into multiple regions with each region have substantially the same regular squared shape. However, it is contemplated that the method described below may be applied to discretizations where zone 810 is divided into regions of irregular shapes and/or unequal sizes. The regions may be labeled from the upper left corner to lower right corner as 1, 2, 3, ..., $N_d$. An object 830 may include more than one regions, e.g., regions $R_a$ and $R_b$. In this example, it may be assumed that a set of selected MSEs may be represented by $[\theta 1, \theta_2, \ldots \theta N_m]$. As discussed earlier, each MSE may correspond to a known field pattern inside the energy application zone (e.g., zone 810). Since the energy application zone has been discretized into Nd regions, for each MSE $\theta_j$, a corresponding known field pattern may be represented by a series of local electrical field intensities $[I_{1,j}, I_{2,j}, I_{3,j}, \ldots, I_{Nd,j}]$. The electrical field intensity at a particular region of the zone is proportional to the square of the electrical field amplitude at that region. For all applied MSEs, the field patterns may be collectively written in matrix form as:

$[I_{11}, I_{21}, I_{31}, \ldots, I_{Nd1};$
$I_{12}, I_{22}, I_{32}, \ldots, I_{Nd2};$
...
$I_{1Nm}, I_{2Nm}, I_{3Nm}, \ldots, I_{NdNm}]$ This matrix, referred to as the I matrix, may be determined after the MSEs and the discretization are determined.

In some embodiments, a resolution of the different regions (for example, to which different amounts of energy are applied) and/or a resolution of a discretization of the zone (e.g., by dividing the zone into a plurality of regions) may be a fraction of the wavelength of the applied EM energy, e.g., on the order of $\lambda/10$, $\lambda/5$, $\lambda/2$. For example, for 900 MHz, the corresponding wavelength ($\lambda$) in air ($\in=1$) is 33.3 cm and the resolution may be on the order of 3 cm, e.g., (3 cm)$^3$ or 1(mm)$^3$ resolution. In water, for example, the wavelength is approximately nine times shorter at the same frequency (900 MHz), thus the resolution may be in the order of 0.33 cm, e.g., (0.33 cm)$^3$. In meat, for example, the wavelength corresponding to frequency of 900 MHz is about seven times shorter than in air and the resolution may be in the order of 0.4 cm, e.g., (0.4 cm)$^3$. Using higher frequencies may allow for higher resolution. For example, in other frequencies, the resolution may be in the order of: 0.1 cm, 0.05 cm, 0.01 cm, 5 mm, 1 mm, 0.5 mm, 0.1 mm, 0.05 mm or less.

For each of the plurality of field patterns, a processor may be configured to determine an amount of power dissipated in the energy application zone. An amount of power dissipated in the energy application zone may be the amount of power that is absorbed by any energy absorption medium in the zone and may be measured directly or indirectly. As an example of direct measurement, a temperature sensor may be placed at various locations in the zone, and the amount of power may be estimated based on the temperature rise. As an example of indirect measurement, the amount of power dissipated in the energy application zone may be measured by taking into account the incident power from the radiating element (e.g., radiating element 18), and determining the power reflected back and/or transmitted into at least one of the radiating elements. The reflected/transmitted power may be received by radiating elements 18 functioning as receivers, and detected by detectors 40 (see, e.g., FIGS. 1, 5A, 5B, 6, 7A and 7B). The amount of power dissipated may then determined as the difference between the incident power and the reflected (and optionally transmitted) power.

The determined amount of power dissipated in the energy application zone may be a total power dissipated in the energy application zone. For example, the amount of power may include the total power that is absorbed by the object in the zone, the walls of the zone, and/or any other energy absorption medium in the zone. The amount of power may be determined, for example, as PD1-PRf, where PD1 is the total power applied into the energy application zone (incident power), and PRf is the total power reflected from the energy application zone and/or transmitted into non-emitting radiating elements.

In some embodiments, the processor may be configured to determine an amount of power dissipated only in a predetermined portion of the energy application zone. For example, the processor may apply selected field patterns that have high field intensity areas (hot spots) covering only a predetermined portion of the energy application zone. In that case, the determined power dissipated in the energy application zone may be substantially dissipated in the predetermined portion, as other portions of the energy application zone are covered by lower field intensity areas (cold spots) and may absorb a minimal amount of power.

The predetermined portion may include one or more parts of the object in the energy application zone. In some embodiments, if the location of the object is known, the processor may be configured to select field patterns that have high field intensity areas aligned with the location of the object or a portion of the object where energy application is desired. Accordingly, the determined amount of power may be substantially dissipated in desired areas of the object.

In some embodiments, the processor may be configured to differentiate between power dissipated in the object and power dissipated elsewhere, and associate that information with each of the plurality of field patterns. In some instances, the processor may determine the total power dissipated in the zone first, as described earlier, and then separate the determined amount into an amount of power dissipated in the object and an amount of power dissipated elsewhere.

The processor may differentiate using loss values associated with the energy application zone structure (e.g., cavity walls). In some embodiments, the processor may calculate the amount of power dissipated in the walls of the zone based on the intensity distribution of the field pattern and the loss values associated with the walls. The calculation may be based on the Born approximation. In some other embodiments, the processor may also differentiate by measuring the amount of power dissipated elsewhere. Again, this approach may also involve the use of Born approximation.

In some embodiments, the determined amounts of power for the entire applied field pattern may be stored as a vector. For example, assuming the set of applied MSEs may be represented by $[\theta_1, \theta_2, \ldots \theta_{Nm}]$, and the amount of power dissipated for each applied MSE $(\theta_j)$ may be represented as $P_j$, then the amounts of power dissipated for the set of MSEs may form a vector $[P_1, P_2, \ldots P_{Nm}]$. Consistent with some embodiments, the vector of dissipated power may be predetermined and programmed into the memory of the at least one processor before energy application. A vector of dissipated power may be predetermined, for example, when similar objects are heated in an oven once and again (for example, pizzas of similar size, shape, and composition). In some embodiments, when the vector of dissipated power is predetermined, a loss profile may be calculated based on the predetermined vector, and programmed into the memory of the at least one processor before energy application. Alternatively, the vector of dissipated power may be determined and stored dynamically during energy application. In some embodiments, a vector of dissipated power may be preprogrammed as default values, and the vector may be dynamically updated, e.g., upon user request, during energy application.

In some embodiments, the processor may be configured to determine a spatial distribution of energy absorption characteristic across at least a portion of the object based on the amounts of power dissipated when the plurality of field patterns are applied to the energy application zone. For example, the at least one processor may be configured to determine the distribution of energy absorption characteristic by calculating a distribution of indicators of absorbable electromagnetic energy in the object. An object's ability to absorb energy across its volume may be expressed as a "loss profile." The term "loss" may include any electromagnetic energy that is not reflected back to the radiating element that emitted it or not transmitted to another radiating element. The term "loss" may also refer to dielectric loss, which may refer to the electric energy that is converted into heat in the object. The term profile, which also may be referred to as a pattern, image, distribution, etc., may include any spatial distribution, for example, of loss in the energy application zone, as is discussed later in greater detail.

The indicators of absorbable electromagnetic energy may also be referred to as absorption coefficients, loss values, or energy absorption characteristics, and may include any value indicative of energy absorbable in the object (e.g., any value indicative of the dielectric reaction of the medium in the energy application zone to the applied electromagnetic energy). Examples of absorption coefficients include: electromagnetic loss due to ionic conduction (which may be referred to as $\in_\sigma''$); electromagnetic loss due to dipole rotation (which may be referred to as $\in_d''$); and/or a combination of these or other loss components. In some embodiments, the absorption coefficient may be the total loss $\in''$ which may be characterized, for example, by:

$$\in''=\in_d''+\in_\sigma''=\in_d''+\sigma'/(\omega\in_0)$$

where $\sigma'$ is the electric conductivity, $\omega$ is the angular frequency of the applied EM wave, and $\in_0$ is the permittivity of free space or vacuum. Hereinafter, the total loss $\in''$ (also referred to herein as a "loss parameter") may be denoted by "$\sigma$". However, as used herein the term "loss" is broadly used to encompass all kinds of absorption coefficients. By way of example, if an electromagnetic energy-absorbing object is located in the energy application zone, the loss may correspond to the electromagnetic energy absorbing ability of the object.

In some embodiments, the absorption coefficient may be a "loss tangent", which may be defined as the ratio between the lossy and the lossless reactions to the electric field:

$$\tan(\delta)=\in''/\in'=[\in_d''+\sigma'/(\omega\in_0)]/\in'$$

where $\in'$ is the permittivity. For dielectrics with small loss $\tan(\delta)\ll 1$ and thus, $\tan(\delta)$ can be approximated by $\delta$. This may facilitate solving one or more equations.

As briefly mentioned earlier, losses may be characterized in term of their profiles (e.g., a loss profile). A loss profile may be a representation of any absorption coefficient as a function of location in space. For example, a loss profile may be a map, showing areas of different tan $\delta$ (or $\in''$, or any other absorption coefficient) in different colors. In another example, a loss profile may be a matrix, wherein each cell represents a volume cell in the energy application zone, and the value inside the matrix cell is a value of an absorption coefficient characterizing the medium in at volume cell. A loss profile may be represented in various ways in order to convey information about the distribution of energy loss in the energy application zone. A loss profile may be represented using imaging, analytics, numerics, tablature, or any other mechanism capable of reflecting a distribution or partial distribution of energy loss. In some embodiments, a partial distribution may refer to a loss profile that is presented only in one or more parts (regions) of the energy application zone or the object but not necessarily the entire zone.

When represented analytically, a loss profile may, for example, be written in terms of one or more equations. For example, such equations may be written as a function of one or more of time, space, power, phase, frequency, or any other variables that may be correlated to energy losses, including any variables of the MS. When represented numerically, the loss profile may be expressed as a number or a series of numbers. Regardless of the manner of representation, a loss profile may be expressed in either in digital and/or analog formats. For example, the loss profile may be a digital file stored in a memory and loadable into a processor.

The at least one processor may be configured to calculate the distribution of energy absorption characteristics based on, an electromagnetic field intensity associated with each of the plurality of field patterns, and power dissipated in the energy application zone at each of the plurality of field patterns. The presentation of the distribution of energy absorption characteristics may depend on the discretization employed on the energy application zone Just as the energy application zone may be discretized, in a similar manner the loss profile may be discretized and mapped to subregions of the discretized energy application zone. For example, in FIG. 9, where energy application zone 810 is divided into multiple regions labeled 1, 2, 3, . . . , $N_d$, object 830 may include two kinds of materials in region Ra and Rb, having differing loss parameters $\sigma_a$ and $\sigma_b$. The void region (e.g., region $R_c$), which is outside the object but inside energy application zone 810, may have a loss parameter $\sigma_c$. In some embodiments, a loss profile 820 may be created by the processor. Loss profile 820 may list loss values characterizing different regions in energy application zone 810. For example, regions $R_a$, and $R_b$ are characterized by absorption coefficients $\sigma'_a$ and $\sigma'_b$, respectively, which approximates the real loss profile characterized by $\sigma_a$, and $\sigma_b$. To create this loss profile, the processor may assign each region (1 to $N_d$) an unknown loss parameter $\sigma_i$ (i=1, 2, 3, . . . , $N_d$). Such discretized loss profile 820 may be a numerical representation of the real loss profile with a resolution characterized by $N_d$. For example, if $N_d$ is larger than some given value, there may be a correspondingly large number of regions inside the energy application zone and the size of each region may be smaller than if $N_d$ is equal to the aforementioned given value.

For each MSE ($\theta_j$) the power loss $P_j$ (which may be defined as the energy loss per time unit) may be related to the local field pattern intensities $I_{ij}$ as follows: $\frac{1}{2}(\sigma_1 I_{1j} + \sigma_2 I_{2j} + \ldots + \sigma_{Nd} I_{Ndj}) = P_j$. Accordingly, in some embodiments, the at least one processor may be configured to construct the following equation:

$$\tfrac{1}{2}\sigma I = P$$

for all MSEs, where P is a vector of the amounts of power dissipated, I is a matrix of field pattern intensities, and σ is the loss profile, expressed as a vector of the unknown loss values.

Consistent with some embodiments, the at least one processor may be further configured to solve the unknown loss profile such that σ may be solved mathematically. For example, σ may be solved by inverting matrix I and multiplied by vector P as follows:

$$\sigma = 2PI^{-1} \quad \text{Equation (1)}$$

While inverting I may constitute an efficient method for solving the equation, other mathematical methods may be used consistent with the invention. These other methods may include, for example, various stationary iterative methods such as the Jacobi method, the Gauss-Seidel method and the Successive over-relaxation method, etc., and various Krylov subspace methods, such as the conjugate gradient method (CG), the generalized minimal residual method (GMRES) and the bi-conjugate gradient method (BiCG), etc. Alternatively, the equation may also be solved using optimization approaches, e.g., minimizing the residual $|\frac{1}{2}\sigma I - P|$, for example, using linear or quadratic programming. Iterative methods and optimization methods may be particularly helpful when it is difficult to directly invert I, or when inverting I may cause large inaccuracies in the solution (e.g., when the equation system is mathematically ill-conditioned, ill-posed, and/or singular).

As described earlier, "loss" may also be represented by absorption coefficients other than σ. In some embodiments, these absorption coefficients may be calculated based on σ'. For example, loss tangent may be determined as $\tan(\delta) = \sigma'/\omega \varepsilon'$.

Figures 10A, 10B:
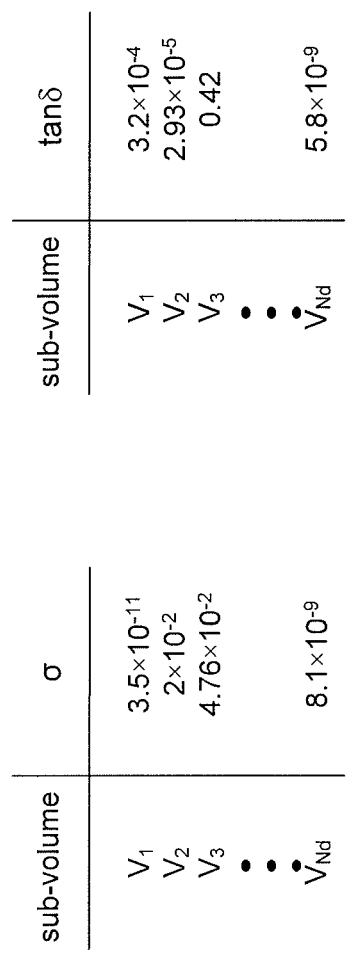
FIGS. 10A and 10B illustrate exemplary loss profiles in the form of a look-up table consistent with some embodiments of the invention.

In some embodiments, the at least one processor may be further configured to cause the distribution of energy absorption characteristic to be stored as a look-up table. When represented in tablature, the loss profile may assume the form of a table containing a correlation between physical space and the energy absorbed at specific locations in that space. For example, the look-up table may dictate a relationship between a plurality of regions of the energy application zone and their corresponding absorption coefficients. Exemplary look-up tables of stored absorption coefficients σ and $\tan(\delta)$ are shown in FIG. 10A and FIG. 10B. The left column of each look-up table lists the labels of the regions (e.g., volumes) in the energy application zone, according to the discretization of the zone. The right column lists corresponding σ or $\tan(\delta)$ of each region.

In some embodiments, the at least one processor may be further configured to cause the display, e.g. as an image, of a distribution of energy absorption characteristic in at least one portion of the energy application zone. By way of example only, a loss profile may be displayed as a 2D image as shown in the right hand side of FIG. 9. When displayed as an image by using any imaging techniques, the loss profile may assume a form of a black and white image, gray-scale image, color image, surface profile image, volumetric image, or any other graphical depiction. It should be understood that the 2D image shown in FIG. 9 is a simplified example for ease of discussion. In graphical terms, the loss profile may be represented as an image, for example, in one-, two-, three-, and/or four-dimensions, wherein the forth-dimension may refer to time (e.g., a 3D spatial loss profile over time may displayed).

In some embodiments, at least one processor may be configured to determine a location of the object based on the distribution of energy absorption characteristics. For example, the determined loss profile a may be mapped to the energy application zone.

In FIG. 9, loss profile 820 is mapped to energy application zone 810. Loss profile 820 may reflect the spatial distribution of loss (σ) in energy application zone 810. For example, the loss profile may reflect the energy absorption property of object 830 located in energy application zone 810. Because the object regions are usually associated with energy absorption characteristics that are distinct from those of the void regions, the processor may determine the location of object 830 based on loss profile 820. For example, the processor may determine the coordinates of the object 830 relative to the energy application zone 810.

In some embodiments, at least one processor may be configured to determine a location of the object based on known locations of high field intensity (hot spots) resulting from each of the plurality of field patterns. As described earlier, the field pattern may be determined or predicted based on the applied MSE through testing, simulation, or analytic calculation. The prediction may be conducted online, for example, during energy application, or may be made in advance, for example, before an energy application cycle begins. The predictions may be saved, for example, in a lookup table, allowing the processor to use these predictions during operation according to embodiments of the present invention. The field pattern may cause one or more high field intensity areas in the energy application zone where the field intensities and/or the losses are high. As used herein, the terms "high field intensity area" and "hot spot" refer to a region where the electromagnetic field intensity is substantially higher than in the surrounding regions. In other words, these terms refer to regions where electromagnetic power concentrates and therefore where the transfer of electromagnetic energy from electromagnetic waves to an object is more effective than that in surrounding areas of similar absorption coefficient. Similarly, a "cold spot" or area of low field intensity refers to a region where the electromagnetic field intensity is substantially lower than the surrounding regions. Therefore, the transfer of electromagnetic energy is less effective in low field intensity areas than in areas of higher field intensity, provided the absorption coefficients are similar.

Consistent with some embodiments, the processor may either learn, or may be preprogrammed with the coordinates of each hotspot in each field pattern. This is achievable because, as discussed earlier, the MSEs result in predictable patterns with predictable high field intensity areas. The coordinates of the hotspot may indicate the location and the size of the hotspot.

As described earlier, the processor may be configured to receive an indication that the detector has received feedback associated with energy absorption at a particular field pattern. The processor may be further configured to determine that an object is located in one of the high field intensity areas corresponding to that particular field pattern. The more field patterns that are applied to the energy application zone, the more information the processor may obtain about the location and the absorptive properties of the object in the energy application zone. Over a series of such measurements with differing MSEs, the processor can narrow-in on the location of the object in the space and/or the spatial distribution of absorptive properties in the energy application zone.

Figure 3D:
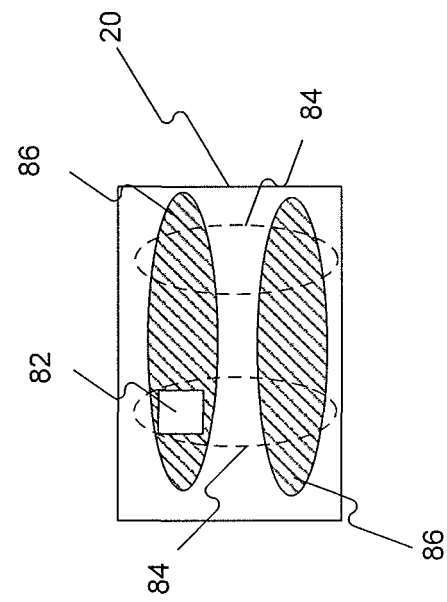
FIGS. 3C and 3D illustrate exemplary field patterns in a modal cavity consistent with some embodiments of the invention.
Figure 3C:
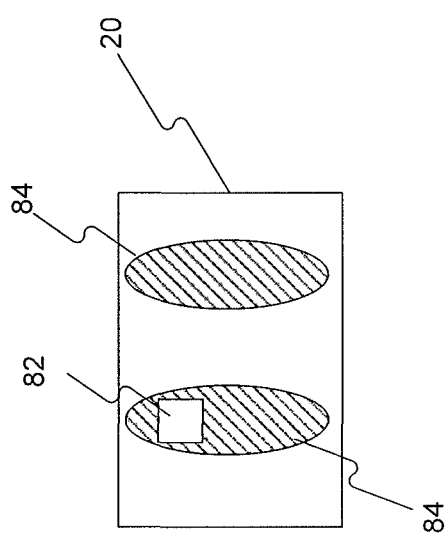

By way of an example, FIG. 3C shows a field pattern with two high field intensity areas 84 in energy application zone 20. The areas other than high field intensity areas 84 in energy application zone 20 may be referred to as low field intensity areas or cold spots. The field pattern shown in FIG. 3C may be predetermined, and as a result, the location of the two hot spots 84 may be known in advance. An object 82 may be located in energy application zone 20 and may be capable of absorbing electromagnetic energy. The processor may be configured to receive from detectors feedback information indicative of energy absorption, such as the amount of power dissipated in energy application zone 20, as described earlier. If at least one hot spot coincides with a location of the object, the amount of energy absorbed in the energy application zone may be substantially larger than the case in which the hot spot does not coincide with the location of the object. Therefore, the processor may determine that object 82 is coincides with at least one of the hotspots 84 thus located in the area of at least one of the hotspots.

FIG. 3D shows a field pattern with two hot spots 86, one of which coincides with an area in energy application zone 20 in which object 82 is located. Thus, a processor may be configured to receive feedback information indicative of energy absorption associated with the field pattern of FIG. 3D, and determine that the location of object 82 is within at least one of the areas covered by the two horizontal high field intensity areas 86. Therefore, using the location information obtained associated with both FIG. 3C and FIG. 3D, the processor may then determine that the object is with an area covered by the intersections of high field intensity areas 84 and 86, as shown in FIG. 3D, in which the dashed lines correspond to the high field intensity areas 84 in the field pattern of FIG. 3C. By receiving feedback in a similar manner from additional field patterns, the processor may more precisely hone-in on the location of object 82. By applying even more field patterns, the processor may be able to determine the general shape, or even the precise shape of object 82. The feedback information may also provide an indicator of the identity of the object, particularly if the loss profile of the object is known, and the processor merely has to identify the location and orientation of the object based on the feedback information received from the energy application zone.

In some embodiments, the processor may be further configured to cause differing amounts of energy to be applied to differing portions of the energy application zone based on the distribution of energy absorption characteristics. For example, differing amounts of energy may be delivered to regions $R_a$ and $R_b$ (illustrated in FIG. 9) within object 830.

In some embodiments, the differing amounts of energy may be determined based on the distribution of energy absorption characteristics in the energy application zone. That is, once an object's ability to absorb energy throughout its volume is determined then energy can be applied to the object in a controlled manner in order to achieve a desired goal. For example, if the goal is to apply energy such that it is uniformly absorbed across an object's volume, then the processor may select combinations of MSEs that result in uniform energy absorption across the object. For instance, a smaller amount of energy may be applied to a part of the object that is associated with a higher absorption rate and a larger amount of energy may be applied to another part of the object that is associated with a lower absorption rate, such that the amounts of energy absorbed by the two regions are substantially the same. If on the other hand, non-uniform energy application is desired, then the processor may apply amounts of energy with each of the field patterns such that the overall energy absorption corresponds to the desired non-uniformity of energy absorption is achieved. For instance, a larger amount of energy may be applied to regions consisting of water, such that the water in the object is dried up without heating the other constituents in the object. More generally, a larger amount of energy may be applied to regions consisting of a particular substance, in order to process the particular substance more intensively than other substances.

The processor may be configured to regulate the source in order to deliver differing predetermined amounts of energy to the energy application zone. For example, as previously discussed, since the manner in which energy is distributed is a function of a number of controllable variables and the amount of their possible settings (e.g., MSEs), the processor may be configured to alter MSEs in order to achieve differing energy distributions in the energy application zone. The exemplary apparatus as shown in FIGS. 1, 5A, 5B, 6, 7A, and 7B may be utilized to alter MSEs and apply the desired field patterns.

In some embodiments, radiating elements may be selected for exciting a certain mode in accordance with the positioning of the radiating elements in the energy application zone. The position of the radiating element may be selected to effectively excite a desired mode and/or to reject an undesired mode. This and other optional features of some embodiments are explained below in reference to FIGS. 12A, 12B, 12C, 13A, and 13B.

Figure 12A:
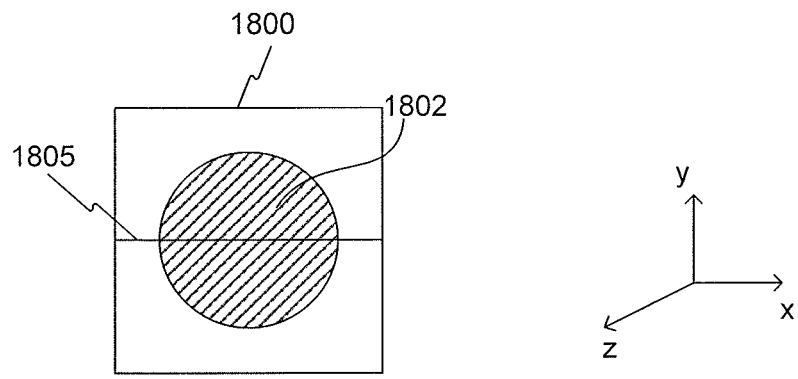
FIGS. 12A-12C illustrate field intensity distributions of modes that may be excited in an energy application zone.
Figure 12B:
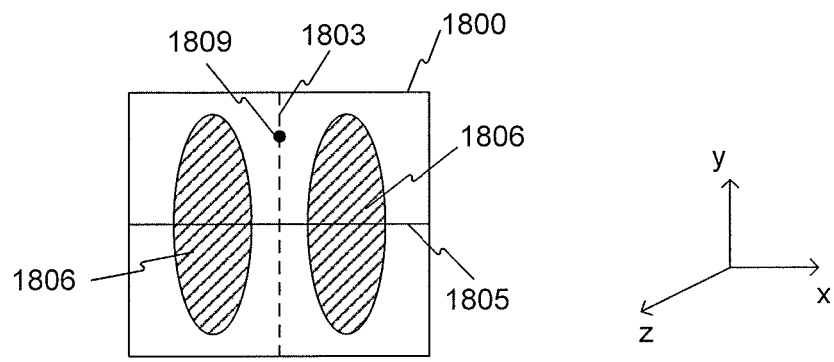
Figure 12C:
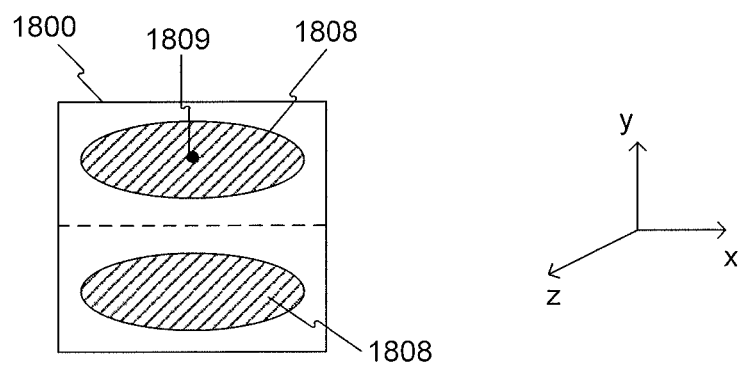

The concept of rejecting modes may be illustrated by FIGS. 12A and 12B, which show X-Y cross sections of two modes 1802 and 1806 excitable in cavity 1800. Mode 1802 is a $TM_{11}$ mode and mode 1806 is a $TM_{21}$ mode. Mode $TM_{11}$ may be excitable at every frequency that is equal to or greater than a lower cutoff frequency $f_{11}$ and $TM_{21}$ may be excitable at every frequency that is equal to or greater than a higher cutoff frequency $f_{21}$. Thus, at intermediate frequencies between $f_{11}$ and $f_{21}$, $TM_{11}$ may be excited without exciting $TM_{21}$, but there is no frequency at which $TM_{21}$ is excitable and $TM_{11}$ is not. Therefore, if one desires exciting $TM_{11}$ at a frequency higher than $f_{21}$ without exciting $TM_{21}$, $TM_{21}$ may need to be rejected. In the present discussion, rejecting a mode may refer to preventing or substantially decreasing the excitation of the mode.

In some embodiments, a desired mode may be excited and an undesired mode may be simultaneously rejected by selecting for the excitation a radiating element positioned at or near a null of the undesired mode, and at or near a maximum of the desired mode. A null of a mode is any location in the energy application zone where the field intensity of the mode is permanently (or in all phases) zero, and a maximum of a mode is any location where the field intensity of the mode reaches an overall maximal value at all phases (or at every instant). A radiating element positioned at the null of a mode does not excite the mode (regardless of the frequency applied), and a radiating element positioned near the null may excite the mode only to a small degree. For example, in FIG. 12B plane 1803 is a collection of null points of mode $TM_{21}$; thus, a radiating element positioned at any point along this line may not excite mode $TM_{21}$, even at frequencies higher than $f_{21}$. However, since line 1809 (which is along plane 1803) is not at a null of mode $TM_{11}$ (1802), mode 1802 may be excited by a radiating element positioned at line 1809. In practice, the radiating element may be positioned anywhere on plane 1803 without exciting mode 1806. In some embodiments, however, the radiating elements may be positioned at the upper (and/or lower) base of the cavity, at a position in the XY plane.

Figure 13A:
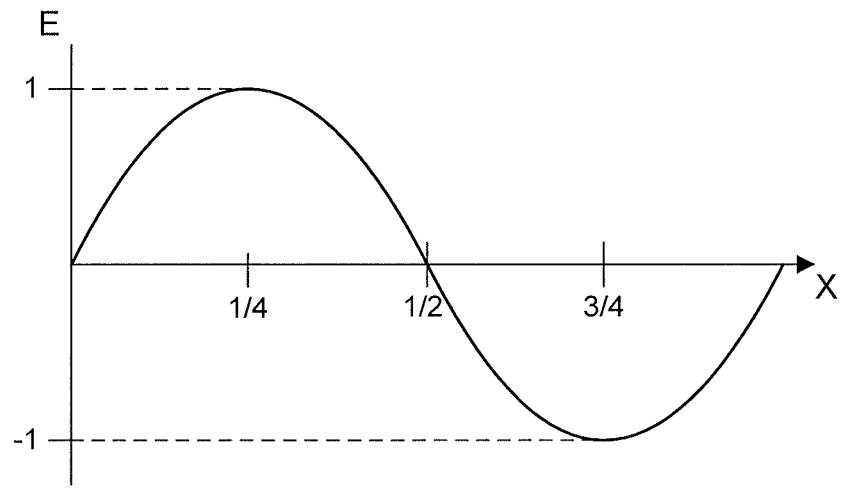
FIGS. 13A and 13B show calculated values of normalized electric field magnitude of two modes excitable at the same frequency in a cavity.

Another way to reject a mode may include using two or more radiating elements, positioned at two or more locations where the magnitude of the electric field of the mode to be rejected is of opposite signs. For example, FIG. 13A depicts the (normalized) magnitude of the electric field of mode 1806 along line 1805. As shown in the figure, at x=0.5 (which is a point on plane 1803), the field is zero, at x=0.25 the field is +1 and at x=0.75 the field is −1. Thus, in some embodiments, two radiating elements, one at x=0.25 and the other at x=0.75 (or at any other two points where the field has opposite signs and equal magnitudes) may be selected to radiate RF waves at the same amplitude and phase, to cancel each other, and thus reject an undesired mode. If the fields at the locations of the two radiating elements have opposite signs and different absolute values, they may still be used for rejecting the undesired mode, if, for instance, their amplitudes are tuned such that sum of the products of field and amplitude at each radiating element location is zero. It is noted that while the above discussion is focused on different points along the X axis, similar considerations may be applied also for points having different y values and/or z values.

In some embodiments, a desired mode may be excited by emitting energy via two antennas that are oriented anti parallel to each other, or that are oriented parallel to each other but emit waves at a phase shift of 180° between each other, and located at points where the field pattern has opposite sign. Similarly, in some embodiments, modes may be rejected by emitting energy via two antennas that are oriented anti parallel to each other, or that are oriented parallel to each other but emit waves at a phase shift of 180° between each other, and located at points where the field pattern has the same sign.

Figure 13B:
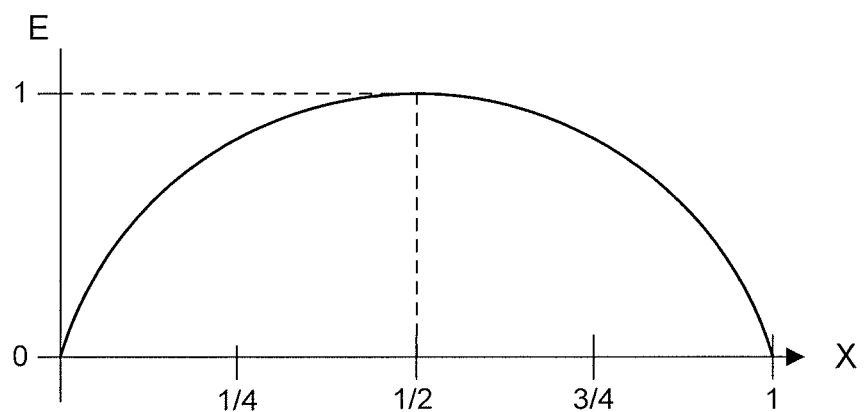

FIG. 13B depicts the (normalized) magnitude of the electric field of mode 1802 along line 1805. As shown in the figure, at x=0.5, the field is maximal, and the field at x=0.25 is equal (both in magnitude and in sign) to the field at x=0.75. Thus, two antennas, one at x=0.25 and the other at x=0.75 that emit at the same amplitude and phase may tend to excite mode 1802. However, two antennas that are oriented anti parallel to each other, or that are oriented parallel to each other but with a phase shift of 180° between each other, may reject mode 1802. Consequently, the latter combination of antennas and phases may excite mode $TM_{21}$ and rejects mode $TM_{11}$.

In some embodiments, a desired and/or an undesired mode is a resonant mode. A resonant mode may be excited when the frequency f of the electromagnetic wave corresponds to the dimensions of the energy application zone in a manner known in the art. For example, in an energy application zone that is a rectangular cavity, a resonant mode may be excited when the dimension, along which the electromagnetic wave propagates, referred to herein as $h_z$, is equal to $N*(\lambda/2)$, where N is a whole number (e.g. 0, 1, 2, 3) and $\lambda$ is the wavelength, given by the equation $\lambda=c/f$, where c is the light velocity in the cavity. A resonant mode is usually marked with three index numbers, where the third index number is N.

When a single resonant mode is excited at a given frequency, a great majority of the power carried with the excitation may be carried by the resonant mode, and other modes, which may be propagating or evanescent, may carry a smaller portion of the power, which may be negligible. Thus, when a single resonant mode is excited, there may be little or no need to reject non-resonating modes. For example, when $h_z=c/f_{21}$ (i.e. when N=2) the antennas and frequency may be selected to excite mode $TM_{21}$ there may be little need to reject, for example, mode $TM_{11}$, because, although mode $TM_{11}$ may be excitable at the applied frequency, it may carry only a small amount of the power, in comparison to the amount of power carried by the resonant mode $TE_{212}$. Thus, in some embodiments, resonant modes may be used for achieving a target field intensity distribution. This may facilitate control over the excited modes, provided sufficient bandwidth and frequency control.

In some embodiments, mode excitation may be further facilitated, (e.g., by easing the requirements from bandwidth and frequency control), by using a degenerate cavity. A degenerate cavity is one in which at least one cut off frequency is a cut off frequency of two or more modes of the same family (e.g., two TE modes). Similarly, each resonant frequency (except for, sometimes, the lowest one) may excite two or more resonant modes of the same family. Some shapes of degenerate cavities may include, for example, cylinder and sphere.

In some embodiments, one desired resonant mode and one or more undesired resonant modes may be excited at a same frequency, and the non-desired modes may be rejected as described above. For example, the same frequency that excites mode $TM_{212}$, a cross section of which is shown as 1806 in FIG. 12B may excite also mode $TM_{212}$, a cross section of which is illustrated as 1808 in FIG. 12C. However, if the excitation is via a radiating element positioned at a null of mode 1808, which is not a null of mode 1806, only mode 1808 may be excited. For example, if the radiating element radiates at frequency $f_{12}=f_{21}$ at line 1809, shown in FIGS. 12B and 12C, only mode 1808 may be excited.

Thus, in accordance with some embodiments of the invention, there is provided apparatus for determining a spatial distribution of energy absorption characteristics across at least a portion of an energy application zone based on amounts of power dissipated when a plurality of predetermined modes are applied to the energy application zone. Modes other than the predetermined ones may be rejected, for example, as described above.

In some embodiments, the same field patterns used to obtain the energy absorption characteristic profile (also referred to as spatial distribution of energy absorption characteristic) may be used to apply the differing amount of energy to the object. For example, the apparatus of FIG. 1, 5A, 5B, 6, 7A or 7B may be utilized to apply frequency modulated electromagnetic waves to the zone for measuring the distribution of energy absorption characteristics as well as for delivering the energy to the object in the zone. In some embodiments, the field patterns applied to deliver the differing amount of energy to the object may be different from those selected to obtain the energy absorption characteristic profile. For example, frequency modulation (e.g., as obtained with the apparatus of FIG. 5A) may be utilized for measuring the distribution of energy absorption characteristics, and phase modulation (e.g., with the apparatus of FIG. 6) may be utilized for delivering the energy to the object in the zone. Additionally, any combination may be used. For example, phase modulation (e.g., using the apparatus of FIG. 6) may be utilized for measuring the distribution of energy absorption characteristics, and a combination of phase and frequency modulations may be utilized for delivering the energy to the object in the zone.

In some embodiments, the at least one processor may be further configured to recurringly determine the distribution of energy absorption characteristic (for example few times during an energy application process, e.g., a heating process). This may be desirable when, for example, distribution of energy absorption characteristic changes over time, as may occur, for example, when the temperature of the substance rises; when phase change occurs (e.g., ice melts and becomes water); when moisture evaporates; or when other properties of an object changes. In these and other instances, the processor may be used to recurringly determine the distribution of energy absorption characteristics during the energy application process.

A time lapse between two recurringly determined distributions of energy absorption characteristics may be pre-determined. By way of example only, the processor may be pre-programmed to determine the distribution every five seconds, one second, fraction of a second, or at some lesser or greater interval. Alternatively or additionally, the time lapse between two recurringly determined distributions of energy absorption characteristics may change dynamically, based on certain characteristics of the energy application process.

A time lapse between two recurringly determined distributions of energy absorption characteristics may be a function of the magnitude of difference between two or more distributions of energy absorption characteristics determined earlier. For example, the decision on the time lapse from the second determination of a loss profile to the third may depend on the difference between the results of the first and second determined profiles. In some embodiments, the "difference" may be a numerical measure, e.g., the sum of differences in the absorption coefficients at all the regions of the zone. In some embodiments, the "difference" may be a graphical measure, e.g., the distance between two distributions as displayed as an image. The magnitude of the difference may suggest how dramatic the change of energy absorption characteristics is in the zone. Accordingly, the distribution may be updated at a higher rate if the distribution changes more dramatically.

In some embodiments, the time lapse may be inversely proportional to the magnitude of the difference. For example, when the difference is $1\times10^{-6}$, the time lapse may be 1 second, and when the difference is $2\times10^{-6}$, the time lapse may be 0.5 second. It is to be understood that the time lapse may also be inversely associated with the difference using other mathematical relationships, and the foregoing are examples only.

In some embodiments, the time lapse between two recurringly determined distributions of energy absorption characteristics may be a function of physical characteristics of the object. For example, the time lapse may be larger when the object contains a substantially amount of protein and fat (e.g., meat), and smaller when the object contains mostly water or ice, and vice versa.

Figure 14:
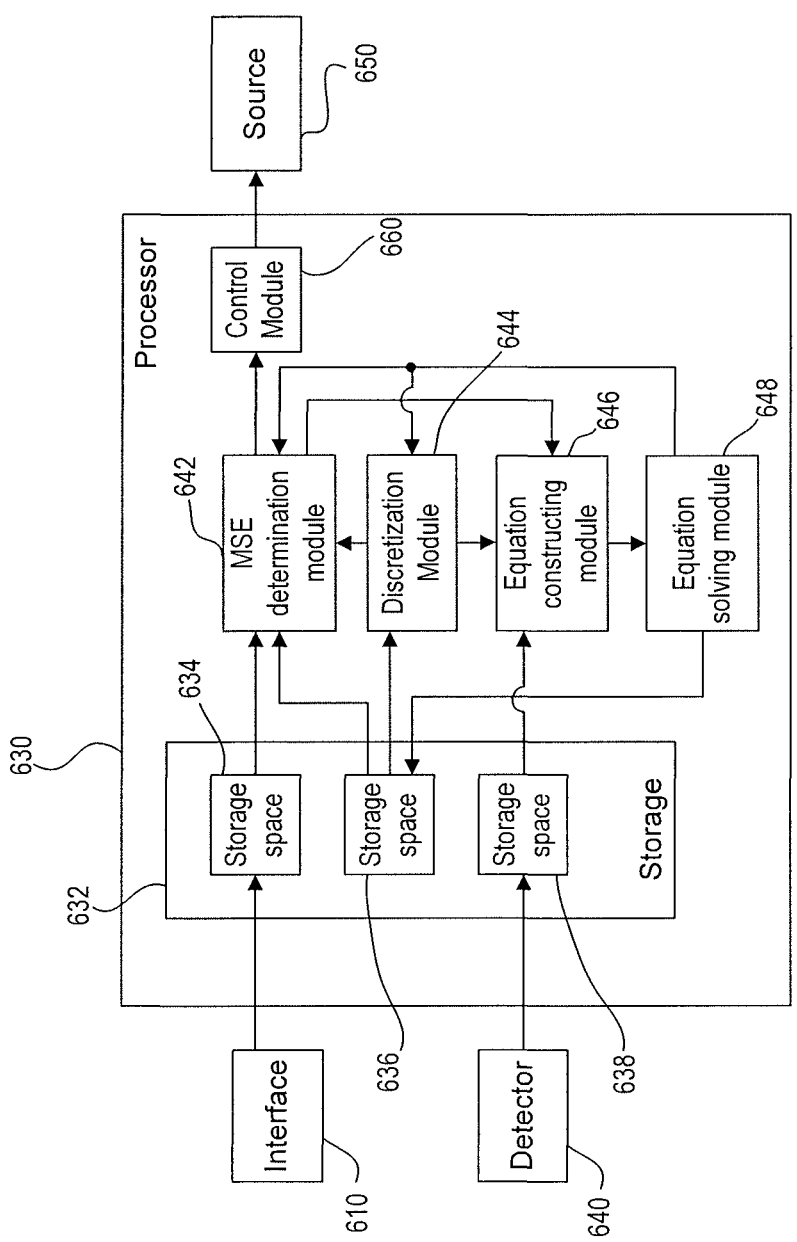
FIG. 14 is a simplified block diagram of a processor configured to construct a loss profile based on feedback from an energy application zone, according to some embodiments.

FIG. 14 is a simplified block diagram of a processor 630 configured to construct a loss profile of at least a portion of an energy application zone, for instance, cavity 20 of FIG. 1, in accordance with some embodiments. Processor 630 may be the same as, may include, or may be part of processor 30. Additionally or alternatively, processor 630 may be in addition to processor 30.

Processor 630 is shown to include storage 632 (which may also be referred to as memory) for storing data, and several processing modules for processing data, for example, data stored in storage 632. Storage space 632 may be continuous, segmented, or may have any other configuration as known in the art of storing data electronically. The modules may be implemented using hardware and/or software and may include, for example, software routines. In some embodiments, two or more of the modules shown in FIG. 14 may be united to a single module, which performs the tasks of the two modules, or may be spread among several modules.

Processor 630 may be connected to an interface 610, for receiving data via the interface. For example, field patterns that may be obtained with different MSEs may be received from the interface, and stored in storage 632, for example, in dedicated storage space 634. Storage space 634 may also store the MSEs, such that each stored MSE may be associated with a stored field pattern, predicted to be excited in the energy application zone when energy is applied to the zone at that MSE. The field patterns associated with the MSEs may be obtained with the energy application zone being empty, and/or the energy application zone having a standard load in it. The standard load may be chosen to be similar to typical loads intended to be used in the energy application zone (for example one or more foods that are usually cooked in an oven, or that the oven is expected to cook often).

In some embodiments, storage 632 may also have storage space 636, for storing a loss profile of the energy application zone or portion(s) of the energy application zone. For example, storage space 636 may store a loss profile of the energy application zone obtained in a preceding loss profile reconstruction cycle. Additionally or alternatively, storage space 636 may store a predicted loss profile. The prediction may be obtained based on knowledge of the object in the energy application zone, its composition, location, orientation, temperature, and/or any other parameter that may affect the loss profile. The stored loss profile may be sent to storage space 636, for example, from interface 610, from another interface (not shown), or from an equation solving module 648 described below. For example, the stored loss profile may be calculated or otherwise predicted by another apparatus and/or at an earlier date, and sent to storage space 636 via interface 610. Storage 632 may also have a storing space 638 for storing energy distributions and/or field intensity distributions obtained in the energy application zone during energy application.

Processor 630 may include an MSE determination module 642. This module may be configured (e.g., by running a suitable software) to determine which of the available MSEs are to be used at any stage of operation, e.g., during an energy application process. In some embodiments, all the available MSEs may be used by default, and the MSE determination module 642 may be omitted. In other embodiments, module 642 may determine MSEs to be used, for example, based on the predicted loss profile. Module 642 may retrieve predicted loss profile data stored on storage space 636. Alternatively or additionally, module 642 may select MSEs that are relatively easier to excite and/or control, and may select other MSEs only if, for example, the easily excited MSEs do not provide satisfactory results.

Module 642 may be connected to control module 660, which may control source 650 of electromagnetic energy to excite the selected MSEs. Source 650 may include power supply, a modulator, an amplifier, and/or radiating element(s) or portions thereof (for example power supply 12, modulator 14, amplifier 16, and radiating element 18 illustrated in FIG. 1). In some embodiments, the energy distribution obtained in the energy application zone as a result of the excitation may be measured. The measurements may be carried out by one or more detectors, shown collectively as 640. One or more of detectors 640 may be a part of source 650, and the others, if any, may be separate and/or independent from source 650. It is noted that source 650 and detector 640 may in practice be embodied in the same parts, for example, the same antennas may be used for supplying energy to the energy application zone and for measuring excited field patterns, even if not necessarily at the same time. The results of the measurements may be stored on storage space 638.

Processor 630 may also include a discretization module 644, configured to divide the energy application zone to regions, for example, as depicted in FIG. 8A, 8B, or 8C. Discretization module 644 may divide the energy application zone in accordance with a loss profile stored in storage space 636. For example, module 644 may divide the zone more densely where more abrupt loss changes are present in the predicted loss profile. In some embodiments, the predicted loss profile may be provided in accordance with a given discretization, for example, as a matrix of values, each associated with one portion of the energy application zone. Module 644 may then discretize the energy application zone in accordance with the discretization by which the predicted profile is provided. Module 644 may retrieve data from storage space 636, saving the predicted profile. For example, module 644 may divide the energy application zone such that volumes characterized by similar losses will be included in a single region. Discretization module 644 may also divide the energy application zone in accordance with a predetermined discretization scheme, for example, a default discretization scheme. One possible default discretization scheme is illustrated in FIG. 8A.

Processor 630 may also include an equation constructing module 646, configured to construct equations according for example, equation 2 (below) to be solved in order to obtain the loss profile. Module 646 may define the field intensity of each of the MSEs which may be selected by module 642, in each region to which the energy application zone is divided by module 644, and may take into account measurement results stored at storage space 638.

Once the equations are constructed by module 646, equation solving module 648 may solve the equations, for example, by linear programming or any other means known in the art for solving linear equations. If equation solving module 648 determines that the equations are not solvable or that the solution is not satisfactory, for example is not sufficiently stable, module 648 may trigger module 642 and/or module 644 to amend the selected MSEs and/or the discretization.

If the equations are solved, the obtained loss profile may be saved, for example, at storage 636, for further use. One further use may be as a prediction for a future loss profile, for instance, after the object temperature changes. Another future use may be to guide energy application to the energy application zone.

The invention may include a method for applying electromagnetic energy to an object. Such an energy application may be accomplished, for example, through at least one processor (for example processor 30 or 630) implementing a series of steps such as those set forth in process 1000 as set forth in the flow chart of FIG. 11. Process 1000 may be used to dynamically determine a loss profile 820 for a given energy application zone, which may include an object, for example, object 830 (FIG. 9).

Figure 11:
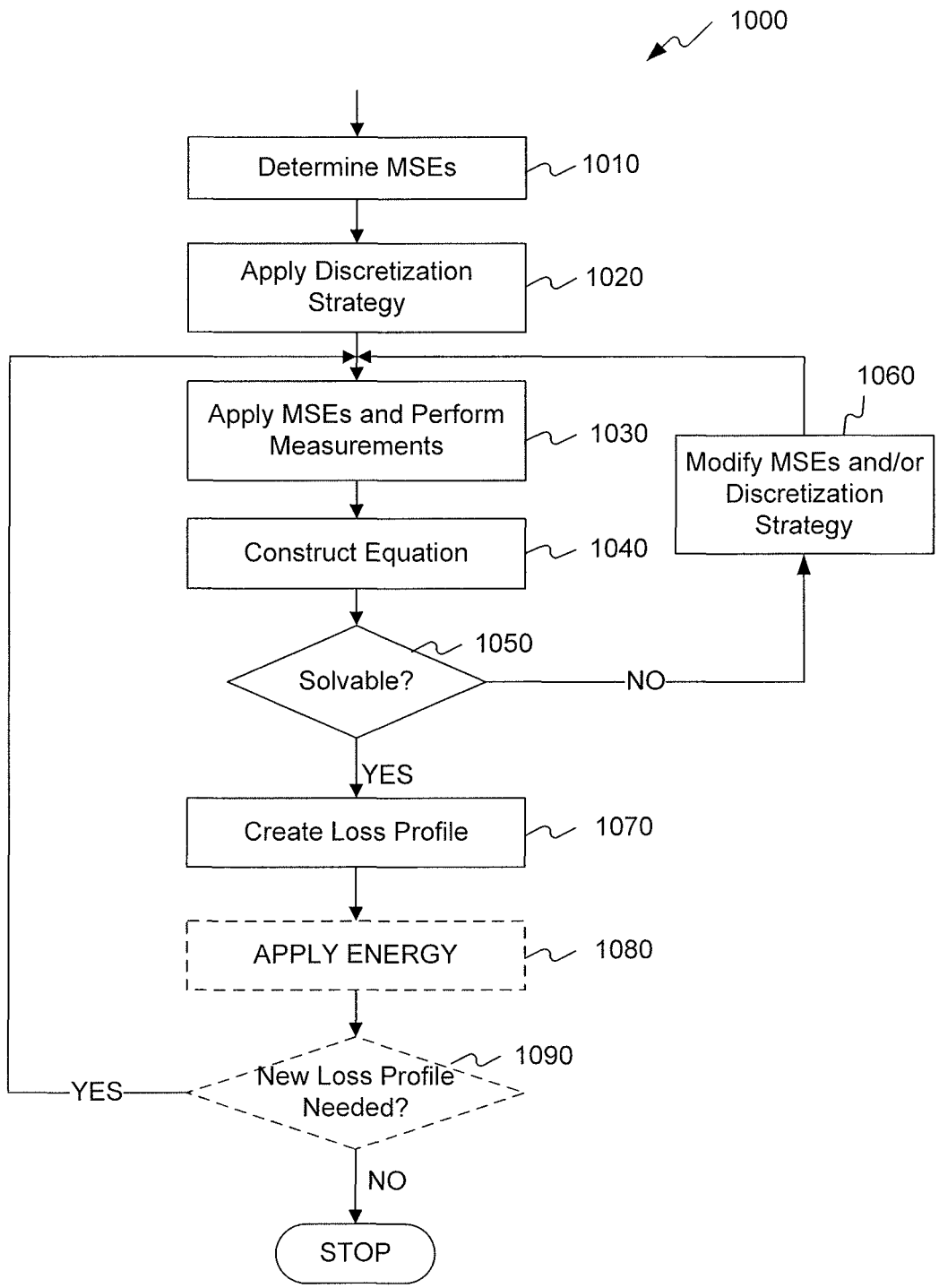
FIG. 11 is a flow chart of exemplary steps of applying electromagnetic energy to an energy application zone consistent with some embodiments of the invention.

Process 1000 may include causing a source of electromagnetic energy to apply a plurality of electromagnetic field patterns to an energy application zone, which may include an object. As indicated in FIG. 11, the processor may determine a set of MSEs for use in step 1010. As discussed previously, an MSE may be correlated to a known field pattern. Therefore, by determining a set of MSEs, the processor may control application of electromagnetic energy to the energy application zone and generate a set of known field patterns in the zone. In some embodiments, all available MSE may be used and step 1010 may be omitted.

The method of constructing a controlled EM field pattern inside the energy application zone from a predetermined set of field patterns may be referred to as "EM spatial filtering." The term "filtering" refers to an ability to discriminate spatial locations and the field intensities thereof in terms of a set of known EM field patterns. And since each of the predetermined set of field patterns can be correlated with one or more controllable MSEs, it is possible to represent a controlled EM field pattern in terms of one or more MSEs. It should be understood that there may be more than one MSE or MSE combinations available to achieve a given field pattern. The choice of MSE to achieve a particular field pattern may be application dependent, e.g., locations where it is desirable to apply EM energy.

In step 1010, a set of MSEs suitable for the process may be determined. For example, a processor may control the energy source to supply EM energy at a plurality of frequencies. In this case, the plurality of frequencies may serve as controllable MSE variables in this process. Alternatively or additionally, the processor may control the energy source to supply EM energy in a plurality of amplitudes. In this case, amplitudes may serve as controllable MSE variables in the process. As described earlier, the selected MSEs may be stored as a MSE matrix.

The processor may cause the source to apply the desired field patterns to the energy application zone (e.g., 810 in FIG. 8), by executing the selected MSEs (step 1030: apply MSEs). Consistent with some embodiments, exemplary apparatus as shown in FIGS. 1, 5A, 5B, 6, 7A and/or 7B may be used to apply the field patterns.

In step 1020, a discretization strategy may be applied to divide the energy application zone (e.g., 810 in FIG. 9) into a plurality of regions. In some embodiments, the process may discretize the space with the following logic. At first, a default discretization strategy (e.g., scheme) may be applied. For example, the energy application zone may be divided to a predetermined number of regions with equal size and shape. The typical size of each such region may be determined in accordance with the MSEs (e.g., frequencies) expected to be applied during energy application. For example, the regions may be rectangular, with each edge having a size of a half, quarter, or other portion of the longest wavelength expected to be applied during energy application. The wavelength used for setting an initial region size may be the wavelength in air, for example, in cases where light velocity in the energy application zone is not known. Feedback obtained from the energy application zone may then be used to determine absorption coefficients characteristics of each of the regions. Then, the regions identified to absorb energy better than others may be discretized to smaller regions to improve the resolution. Regions that show very low energy absorbance may be coalesced. This process may continue until a required resolution is obtained, until the smallest region is of a certain predetermined size, or when any other stopping criterion is met.

In some embodiments, other discretization strategies may be used. For example, some initial information regarding the position and orientation of the object may be obtained, for example, from a user and/or from a camera imaging the energy application zone, for example, with visible light, and then, discretization occurs such that areas occupied with the object are discretized to smaller regions than other areas. In some embodiments, when loss profile determination is recurring, the loss profile obtained in a preceding determination may be used as input for determining the discretization in a following loss profile determination.

The foregoing are but some discretization strategies and the invention is not limited to any particular discretization strategy. Rather, a discretization strategy in accordance with presently disclosed embodiments may include any suitable method for causing the processor to represent the energy application zone or the object in it as multiple regions. FIG. 9 is but one example of discretized energy application zone 810, where object 830 occupies multiple regions.

Given a discretization, position of the object and/or loss profile of the energy application zone may be determined as follows.

First, the processor may either learn, or may be preprogrammed with the coordinates of each hot spot in each field pattern corresponding to each MSE. This is achievable because, as discussed earlier, the MSEs result in predictable patterns with predictable hot spots. Therefore, when the processor receives an indication that the detector has received feedback indicative of absorption during a particular MSE condition, the processor may determine that an object portion may coincide with one of the hotspots corresponding to that MSE condition. The more MSEs that are tested for feedback, the more information the processor learns about the location and the absorptive properties of the object in the energy application zone. Over a series of such measurements with differing MSEs, the processor may narrow-in on the location of the object in the space and/or the absorptive properties in each discrete region.

In step 1030, the processor is configured to apply MSEs and controls the EM energy to be supplied into the energy application zone. For each applied MSE, the energy loss in the energy application zone may be measured. For example, such energy loss may be measured by comparing the amount of incident energy applied to the energy application zone to the amount of energy detected to leave the energy application zone, which may include reflected energy, detected by the same radiating element that emitted the incident energy, and transmitted energy, detected by other detectors. The difference between the incident energy and the sum of reflected and/or transmitted energies may correspond to the energy loss in the energy application zone.

In some embodiments, the energy loss can be represented by application duration and power loss P. The power loss may be determined from the incident, reflected, and transmitted powers Since for each MSE ($\theta j$) the power loss $Pj$ may be related to the local intensities $I_{ij}$ as follows:

$$\tfrac{1}{2}(\sigma_1 I_{1j} + \sigma_2 I_{2j} + \ldots + \sigma_{Nd} I_{Ndj}) = Pj,$$

the measured power loss P, the matrix I and the unknown loss profile $\sigma$ may satisfy the following equation constructed from the measured power loss P and known intensities $I_{ij}$:

$$\tfrac{1}{2}\sigma I = P. \qquad\qquad\text{Equation (2)}$$

In step 1040, the processor is configured to construct the equation, for example the processor may construct the equation for solving the unknown loss profile $\sigma$ in accordance with equation 2. While the unknown loss profile $\sigma$ may be solved mathematically from the above equation, the equation is not guaranteed solvable, e.g., the I matrix may be singular. In some other cases, while the equation is solvable, the solution may be inaccurate because, for example, the I matrix may be mathematically ill-conditioned and/or ill-posed. Therefore, in step 1050, a check may be performed to determine if the equation is solvable at a desired accuracy (referred to herein as "solvable"). For example, a processor may calculate the determinant of the I matrix and determine if it is singular. As another example, a processor may calculate the condition number of the I matrix to determine if it is ill-conditioned.

If the above equation is solvable (step 1050: yes), in step 1070, the loss profile $\sigma$ may be solved from the equation using methods such as direct inversion, or various iterative methods, as discussed earlier. If the equation is not solvable (step 1050: no), step 1060 may be conducted where the MSEs and/or the discretization strategy is modified and process 1000 goes back to step 1030. For example, a new set of MSEs may be chosen and applied to the zone, and power dissipated in the zone may be measured accordingly for each new MSEs.

The above-described process may also be a base for energy application process, where the energy is applied in accordance with the obtained loss profile. Such energy application process may include, for instance, optional steps 1080 and 1090.

In step 1080, electromagnetic energy may be applied to the energy application zone based on the loss profile. In some embodiments, a plurality of differing amounts of electromagnetic energy may be selectively applied to differing regions of the energy application zone. For example, a processor may first select a plurality of MSEs to be applied, and each of the plurality of MSEs may generate a different field pattern in the energy application zone. Then the processor may determine the amount of power to be used for applying each MSE and/or the amount of time for supplying the power for each MSE, based on the desired amount of electromagnetic energy to be applied to each region and the loss profile created in step 1070.

In step 1090, a determination may be made as to whether a new loss profile is needed. In some embodiments, a new loss profile may be needed at predetermined time intervals, such as, every five seconds or other interval. In some other embodiments, the determination may be based on the magnitude of a difference between two recurringly determined loss profiles. In yet some other embodiments, the determination may be based on characteristics of the object, such as size, position, shape of the object, and/or substances contained in the object. In some embodiments, the determination may be based on the quality of the loss profile, for instance, if the loss profile is not of sufficient resolution, process 1000 may be repeated, optionally starting at step 1010, where MSEs are determined based on the low resolution loss profile already at hand. In some embodiments, if a new loss profile is needed (step 1090: yes), process 1000 may go back to step 1030 for determining a new loss profile. If a new loss profile is not needed (step 1090: no), process 1000 may be terminated.

In some exemplary embodiments, the processor may regulate the source to apply energy repetitively to the energy application zone. For example, the processor may apply an MSE and cause its corresponding field pattern in the energy application zone for a predetermined time period, then apply another MSE and cause another field pattern in the energy application zone for another predetermined time period. Such energy application duration and/or energy application rate may vary. For example, in some embodiments, energy may be applied to the energy application zone 120 times per second. Higher (e.g. 200/second, 300/second) or lower (e.g., 100/second, 20/second, 2/second, 1/second, 30/minute) rates may be used, as well as uneven energy application rates.

In some embodiments, a set of MSEs may be applied sequentially during a period of time (herein referred to as "MSE scanning"). As used herein, "MSE scanning" is interchangeable with "MSE sweeping." Both "scanning" and "sweeping" may include changing MSEs in one dimension or multi-dimensions. For example, a one-dimensional scanning may refer to changing MSE by changing only frequency, phase, or amplitude. A multi-dimensional scanning may refer to changing MSE by changing two or more of frequency, phase, and amplitude, or any other variables that may be included in an MSE. An MSE scanning may also be repeated at a predetermined rate or after a predetermined interval. At times, a sequence of one or more scans may be performed, e.g., once every 0.5 seconds or once every 5 seconds or at any another rate. The MSE selection in different scans may or may not be the same.

After a given amount of energy (e.g., a predetermined number of Joules or kilo-Joules, for instance, 10 kJ or less or 1 kJ or less or several hundreds of joules or even 100 J or less) has been transmitted or dissipated into the load or into a given portion of a load (e.g., by weight such as 100 g or by percentage, such as 50% of load), a new scan may be performed.

In some exemplary embodiments of the invention, the rate of energy application or the rate of scan (for example, the duration of energy application at each MSE within a scan, the total duration of each scan, energy application interventions between scans, etc) may depend on the rate at which feedback from the energy application zone changes between scans. For example, energy application may start with a trial scan rate, and if differences in feedback between successive scans are above a predetermined upper threshold, the scan rate may be increased. If the change is below a lower threshold (which may be the same as or lower than the upper threshold) the scan rate may be lowered. For example, a threshold of change in dissipation (e.g., a 10% change in sum integral) may be provided or different change rates associated with different energy application/scan rates, for example using a table. In another example, what is determined is the rate of change between energy applications/scans (e.g., if the average change between energy applications/scans is less than the change between the last two energy applications/scans). Such changes may be used to adjust the period between energy applications/scans once or more than once during energy application process. Optionally or alternatively, changes in the system (e.g., movement of the object or structure for hold the object) may affect the energy applications/scans rate (typically major changes increase the rate and minor or no changes decrease it).

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

What is claimed is:

1. An apparatus for applying radio frequency (RF) energy to an object in an energy application zone via at least one radiating element, the apparatus comprising:
    at least one processor configured to:
        cause RF energy to be applied at a plurality of electromagnetic field patterns to the object in the energy application zone;
        for each of the plurality of field patterns, determine an amount of power dissipated in the energy application zone; and
        determine a spatial distribution of energy absorption characteristics across at least a portion of the energy application zone based on the amounts of power dissipated when the plurality of field patterns are applied to the energy application zone; and
    a source of electromagnetic energy, wherein the source includes at least one of a phase modulator, frequency modulator, and amplitude modulator.

2. The apparatus of claim 1, wherein the processor is further configured to determine a spatial distribution of energy absorption characteristics across at least a portion of the object.

3. The apparatus according to claim 1, wherein the at least one processor is configured to calculate the spatial distribution of energy absorption characteristics based on an electromagnetic field intensity associated with each of the plurality of field patterns and power dissipated in the energy application zone at each of the plurality of field patterns.

4. The apparatus according to claim 1, wherein the at least one processor is configured to determine a location of the object based on the spatial distribution of energy absorption characteristics.

5. The apparatus according to claim 1, wherein the at least one processor is configured to determine a location of the object based on known locations of high field intensity areas resulting from exciting each of the plurality of field patterns.

6. The apparatus according to claim 1, wherein the at least one processor is configured to recurrently determine the spatial distribution of energy absorption characteristics.

7. The apparatus according to claim 1, wherein the at least one processor is further configured to cause differing amounts of energy to be applied to differing portions of the energy application zone based on the spatial distribution of energy absorption characteristics.

8. The apparatus according to claim 1, wherein the at least one processor is further configured to cause differing amounts of energy to be applied to differing portions of the energy application zone, such that similar amounts of energy are applied to regions of similar energy absorption characteristics and different amounts of energy are applied to regions of different energy absorption characteristics.

9. The apparatus according to claim 1, wherein the at least one processor is further configured to cause differing amounts of energy to be applied to differing portions of the energy application zone, such that similar amounts of energy are absorbed by regions of differing energy absorption characteristics.

10. The apparatus according to claim 1, wherein the at least one processor is further configured to cause differing amounts of energy to be applied to differing portions of the energy application zone, such that a predetermined spatial distribution of energy absorption is obtained in the energy application zone.

11. The apparatus according to claim 1, wherein the at least one processor is further configured to cause controlled amounts of energy to be absorbed at differing regions in the object.

12. The apparatus according to claim 1, wherein the at least one processor is configured to determine an amount of power dissipated only in a predetermined portion of the energy application zone.

13. The apparatus according to claim 12, wherein the predetermined portion includes one or more parts of the object in the energy application zone.

14. The apparatus according to claim 1, further including at least one radiating element configured to apply RF energy to the energy application zone.

15. The apparatus according to claim 1, further comprising a source of electromagnetic energy, wherein the source includes at least one radiating element configured to apply RF energy to the energy application zone.

16. The apparatus according to claim 1, wherein the energy application zone is a resonant cavity.

17. The apparatus according to claim 1, wherein the energy application zone is a modal cavity.

18. The apparatus according claim 1, wherein the processor is further configured to regulate the source to repetitively apply energy to the energy application zone at an interval of between 0.5 seconds and 5 seconds.

19. An apparatus for applying radio frequency (RF) energy to an object, the apparatus comprising:

a source of electromagnetic energy, wherein the source includes at least one of a phase modulator, frequency modulator, and amplitude modulator;

an energy application zone; and at least one processor configured to:
cause RF energy to be applied in a plurality of electromagnetic field patterns to the object in the energy application zone;
for each of the plurality of field patterns, determine an amount of power dissipated in the energy application zone; and
determine a spatial distribution of energy absorption characteristics across at least a portion of the object based on the amounts of power dissipated when the plurality of field patterns are applied to the energy application zone.

20. An apparatus for applying electromagnetic energy in the radio frequency range (RF energy) to an energy application zone via at least one radiating element, the apparatus comprising:

at least one processor configured to:
control distribution of RF energy such that at least two mutually different electromagnetic field patterns are applied to the energy application zone;
for each of the electromagnetic field patterns, determine an amount of power dissipated in the energy application zone; and
determine a spatial distribution of energy absorption characteristics across at least a portion of the energy application zone based on the amounts of power determined for each of the field patterns; and a source of electromagnetic energy, wherein the source includes at least one of a phase modulator, frequency modulator, and amplitude modulator.

* * * * *